(12) United States Patent
Yamasaki et al.

(10) Patent No.: US 6,423,228 B2
(45) Date of Patent: Jul. 23, 2002

(54) TREATING FLUORINE WASTE WATER CONTAINING ORGANIC MATTER, PHOSPHOR AND HYDROGEN PEROXIDE

(75) Inventors: Kazuyuki Yamasaki, Hiroshima; Kazuyuki Sakata; Noriyuki Tanaka, both of Fukuyama, all of (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/790,579

(22) Filed: Feb. 23, 2001

Related U.S. Application Data

(62) Division of application No. 09/369,361, filed on Aug. 6, 1999, now Pat. No. 6,217,765.

(30) Foreign Application Priority Data

Aug. 10, 1998 (JP) .............................................. 10-225877

(51) Int. Cl.[7] .................................................. C02F 3/00
(52) U.S. Cl. ..................... 210/601; 210/616; 210/623; 210/631; 210/705; 210/193.3; 210/196; 210/199; 210/220
(58) Field of Search .................................. 210/601, 616, 210/631, 623, 705, 729, 800, 805, 195.3, 196, 199, 220

(56) References Cited

FOREIGN PATENT DOCUMENTS

| JP | 5-4090 A | 1/1993 |
|---|---|---|
| JP | 5-39830 A | 2/1993 |
| JP | 6-343974 A | 12/1994 |
| JP | 7-736667 A | 5/1995 |
| JP | 8-57498 A | 3/1996 |
| JP | 8-197070 A | 8/1996 |
| JP | 9-174081 A | 7/1997 |
| JP | 10-5769 A | 1/1998 |

*Primary Examiner*—Chester T. Barry
(74) *Attorney, Agent, or Firm*—Nixon & Vanderhye P.C.

(57) ABSTRACT

A calcium carbonate mineral is placed in a lower portion of a second water tank, while sludge precipitated in a sixth water tank is returned to an upper portion. A blower and an air diffusion pipe weakly aerate the lower portion. Thus, an unreacted chemical sludge zone is formed in the upper portion of the second water tank. As a result, the second water tank can execute a primary treatment of fluorine in a waste water by the calcium carbonate mineral, a secondary treatment of fluorine and a primary treatment of phosphor by unreacted chemicals, treatment of surface active agent by microorganisms in a return sludge and reduction treatment of hydrogen peroxide by anaerobic microorganisms in the return sludge. The unreacted chemicals are thus reused, so that the amount of generation of waste can be reduced and concurrently the treatment can be executed with energy conservation.

20 Claims, 16 Drawing Sheets

Fig.2A

| TANK | | RETENTION TIME | TIMING (ELAPSED TIME) |
|---|---|---|---|
| SECOND WATER TANK | LOWER PORTION | 2 HOURS | 1:00–3:00 |
| | UPPER PORTION | 2 HOURS | 2:00–4:00 |
| | SEPARATION CHAMBER | 0.5 HOUR | 4:00–4:30 |
| THIRD WATER TANK | | 0.5 HOUR | 4:30–5:00 |
| FOURTH WATER TANK | | 0.5 HOUR | 5:30–6:00 |
| FIFTH WATER TANK | | 0.5 HOUR | 6:00–6:30 |
| SIXTH WATER TANK | | 3 HOURS | 6:30–9:30 |
| SEVENTH WATER TANK | | 5 HOURS | 9:30–14:00 |

Fig.2B

| TANK | | RETENTION TIME | TIMING (ELAPSED TIME) |
|---|---|---|---|
| SECOND WATER TANK | LOWER PORTION | 1 HOUR | 1:00–2:00 |
| | UPPER PORTION | 1 HOUR | 2:00–3:00 |
| | SEPARATION CHAMBER | 0.25 HOUR | 3:00–3:15 |
| THIRD WATER TANK | | 0.25 HOUR | 3:15–3:30 |
| FOURTH WATER TANK | | 0.25 HOUR | 4:00–4:15 |
| FIFTH WATER TANK | | 0.25 HOUR | 4:15–4:30 |
| SIXTH WATER TANK | | 3 HOURS | 4:30–7:30 |
| SEVENTH WATER TANK | | 5 HOURS | 7:30–12:30 |

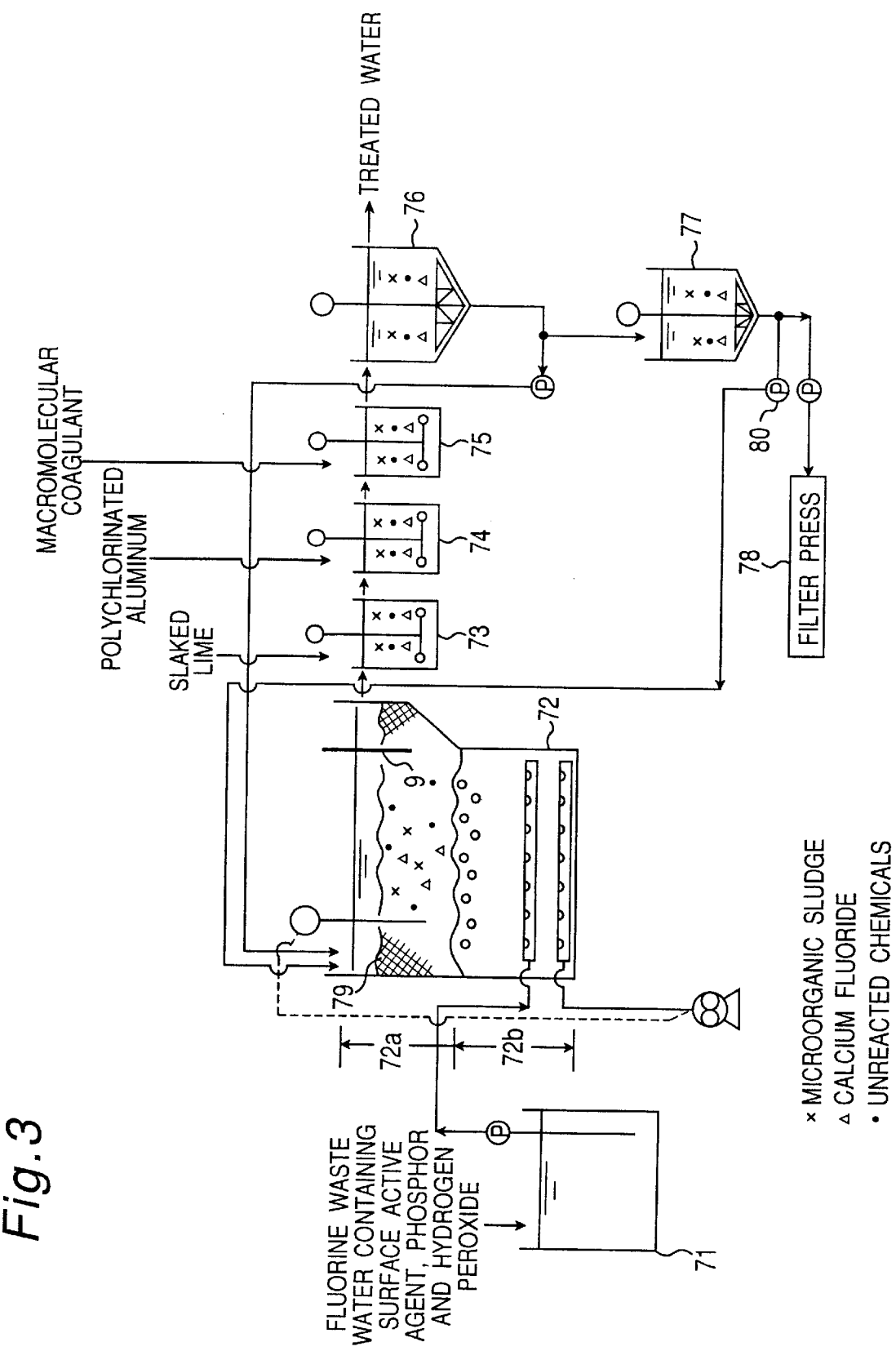

TREATING FLUORINE WASTE WATER CONTAINING ORGANIC MATTER, PHOSPHOR AND HYDROGEN PEROXIDE

This application is a division of U.S. application Ser. No. 09/369,361, filed Aug. 6, 1999, now U.S. Pat. No. 6,217,765.

BACKGROUND OF THE INVENTION

The present invention relates to a waste water treatment method capable of treating fluorine waste water containing organic matter (in particular, surface active agent having low biodegradability), phosphor and hydrogen peroxide discharged from a semiconductor plant, a liquid crystal plant or the like while producing a small amount of waste as sludge, saving energy and reusing chemicals, and the invention also relates to waste water treatment equipment implementing this waste water treatment method.

In a semiconductor plant, a liquid crystal plant or the like, a surface active agent is used while being mixed in a variety of chemicals used by the manufacturing apparatus. In the manufacturing apparatus of the semiconductor plant or the like, it is a general practice to use phosphoric acid, hydrogen peroxide and hydrofluoric acid, and among others, there is a tendency that a large amount of hydrofluoric acid is used. For the above reasons, fluorine waste water containing a surface active agent, phosphor and hydrogen peroxide is discharged from the semiconductor plant, the liquid crystal plant or the like.

In this case, the aforementioned "fluorine waste water containing a surface active agent, phosphor and hydrogen peroxide" means an "acid waste water that mainly includes fluorine and contains a small amount of surface active agent, phosphor and hydrogen peroxide" and further means a "hydrofluoric acid waste water that mainly includes fluorine and contains a small amount of surface active agent, phosphor and hydrogen peroxide".

The mixture of the surface active agent in the various chemicals in the semiconductor plant, the liquid crystal plant or the like is for the reasons as follows. That is, under the circumstances of the rapid microstructural progress of semiconductor devices, elaborate portions cannot be sufficiently cleaned by only the aqueous cleaning with ultrapure water due to the surface tension of the water. Therefore, a method for cleaning the elaborate portions by reducing the surface tension with the mixture of a surface active agent in the ultrapure water and a method for executing the cleaning by reducing the surface tension with the mixture of a surface active agent (for example, a chemical such as buffered hydrofluoric acid containing a surface active agent) in a variety of cleaning chemicals are gaining popularity. In such a case, the types of the various surface active agents to be mixed in the chemicals are the important know-how of the chemical manufacturers, and newly developed surface active agents are consistently mixed.

Among the newly developed surface active agents, there are ones that have low biodegradability from the viewpoint of molecular formula, structural formula, effervescence, sterilizing performance and so on. This means that the conventional activated sludge method, catalytic oxidation method or the like as a representative of the biotic treatment, the methods become incapable of coping with the surface active agents since the methods have a microorganic concentration of about 2000 ppm to 5000 ppm.

According to a recent report, there is the indication that some surface active agents become hormone disrupters, and some countermeasures are required to be taken. On the other hand, from the viewpoint of the destruction of the environment, it is an important urgent problem that the enterprises should tackle to reuse the used chemicals, reduce waste generated from the plants and conserve energy of a variety of equipment for the achievement of cost reduction.

Conventionally, as a waste water treatment method for reusing the sludge including unreacted chemicals, there are the methods disclosed in the prior art references of Japanese Patent Laid-Open Publication Nos. HEI 5-39830, HEI 8-197070 and HEI 10-5769. Each of these three waste water treatment methods sends the sludge precipitated in the sedimentation tank back to the reaction tank or the coagulation tank where a stirrer is installed. It is to be noted that the prior art reference of Japanese Patent Laid-Open Publication No. HEI 5-39830 discloses pneumatic stirring in addition to the stirring by means of the stirrer.

The fluorine waste water is basically treated by forming a slightly-soluble calcium fluoride. In this case, for the purpose of reducing the sludge as a water generated from the waste water treatment equipment, there is adopted a method for using calcium carbonate mineral instead of the conventional slaked lime method for using slaked lime. As described above, the slightly-soluble calcium fluoride is formed through the fluorine waste water treatment. The calcium fluoride is not dissolved under the condition of either acid or alkali. Therefore, the calcium agent of slaked lime or calcium carbonate mineral can be reused again and again through circulation or another method to enable the formation of calcium fluoride that acts as the core of floc, so that the reduction of waste and the reduction in amount of use of chemicals are achieved to allow efficient waste water treatment to be achieved.

The above matter will be simply described. First of all, in a first step, the calcium agent of slaked lime or calcium carbonate mineral is added to form slightly-soluble calcium fluoride, by which the fluorine in the waste water is treated to a concentration of about 20 ppm to 40 ppm. Next, in a second step, an inorganic coagulant of polychlorinated aluminum or the like is added to the waste water obtained through the first step, and then a macromolecular coagulant is added to reduce the concentration to the intended concentration. In the above second step, the fluorine concentration cannot be reduced to the intended concentration unless a large amount of inorganic coagulant such as the polychlorinated aluminum or the macromolecular coagulant with respect to the amount of fluorine in the waste water is added. As a result, the unreacted aluminum, macromolecular coagulant and so on precipitate together with the slightly-soluble calcium fluoride to be consequently included in the sludge. Therefore, by sending the sludge including the unreacted aluminum, macromolecular coagulant and so on back to the reaction tank or the coagulation tank, the unreacted aluminum and the unreacted macromolecular coagulant are reused.

As a method for treating the water containing fluorine by means of calcium carbonate, there is the prior art reference of Japanese Patent Laid-Open Publication No. HEI 7-136667. According to this treatment method, the water containing fluorine is made to flow through a plurality of towers containing calcium carbonate, and after the outflow water that has flowed through each tower containing calcium carbonate is aerated, part of the water is made to flow through the immediately preceding tower containing calcium carbonate. By thus aerating the outflow water of each tower containing calcium carbonate, $H_2CO_3$ in the outflow water is discharged as a $CO_2$ gas. By subsequently making the water flow through the same tower containing calcium carbonate, the amount of $H_2CO_3$ to flow into the tower containing calcium carbonate can be reduced as far as possible. Consequently, the amount of addition of the alkali agent of ammonia, ammonium fluoride or the like for the prevention of the collapse of the calcium carbonate filler material due to $H_2CO_3$ can be reduced.

A method for treating an organic waste water containing fluorine is disclosed in the prior art reference of Japanese Patent Laid-Open Publication No. HEI 5-4090. According to this treatment method, the water-soluble calcium compound of slaked lime, calcium chloride or the like is added to the organic waste water containing fluorine so as to coagulate and precipitate the calcium fluoride. After adjusting pH of the supernatant liquid to 6.5 to 7.0, the water is brought in contact with fixed microorganic pellets to undergo an aeration treatment for the removal of BOD (Biological Oxygen Demand) components. Subsequently, a coagulant is added to precipitate together the microorganisms leaked from the fixed microorganic pellets and the remaining fluorine compound. By thus adjusting the liquid pH to 6.5 to 7.0 and bringing the organic waste water containing fluorine to the fixed microorganic pellets after the coagulo-sedimentation treatment, the calcium is prevented from adhering to the micropores of the fixed microorganic pellets, so that a high rate of removal of fluorine and BOD can be consequently achieved.

Waste water treatment equipment for treating fluorine waste water containing organic matter is disclosed in the prior art reference of Japanese Patent Laid-Open Publication No. HEI 9-174081. As shown in FIG. 14, this waste water treatment equipment has a first water tank 1 having an upper portion 1A and a lower portion 1B. Then, the upper portion 1A is provided with an air diffusion pipe 2 and containing a granular calcium carbonate mineral 3. This calcium carbonate mineral 3 is made to strongly flow by the aeration of the air diffusion pipe 2. The fluorine in the waste water supplied from the downside of the lower portion 1B chemically reacts with the calcium carbonate mineral 3 and becomes calcium fluoride to treat the fluorine in the waste water. On the other hand, microorganisms propagate on the surface of the calcium carbonate mineral 3 that has subsided from the upper portion 1A to the lower portion 1B of the first water tank 1, thereby biologically treating the organic matter in the waste water. Thus, the calcium carbonate mineral 3 that has moved to the lowermost portion of the lower portion 1B is moved toward the upper portion 1A while being mixed with the waste water by an air lift pump 4 so as to chemically treat the fluorine in the waste water in the upper portion 1A. Then, the inorganic sludge and the biotic sludge. that are comprised mainly of calcium fluoride and generated in the first water tank 1 are subjected to a coagulation treatment by polychlorinated aluminum added as an inorganic coagulant. Thereafter, the sludge is moved to a third water tank 6 so as to be separated into sludge in the form of a precipitate and a treated water in the form of a supernatant liquid.

Waste water treatment equipment capable of concurrently treating waste water and exhaust gas containing fluorine and surface active agent is disclosed in the prior art reference of Japanese Patent Laid-Open Publication No. HEI 8-57498. As shown in FIG. 15, in this waste water treatment equipment, a calcium carbonate mineral 12 is placed in a lower portion of a first reaction regulation tank 11, while a calcium carbonate mineral 12 and a plastic filler 13 are placed in an upper portion. A waste water containing fluorine and surface active agent is firstly aerated and stirred in the lower portion of the first reaction regulation tank 11, sprinkled in the upper portion of the first reaction regulation tank 11, aerated and stirred in the lower portion of a second reaction regulation tank 14, sprinkled in the upper portion of the second reaction regulation tank 14, subjected to coagulation with coagulant added to a reaction coagulation tank 15 and then subjected to solid-liquid separation into sludge as a precipitate and supernatant liquid in a sedimentation tank 16. It is to be noted that the sludge (mixed sludge including inorganic sludge, organic sludge and biotic sludge) precipitated in the sedimentation tank 16 is returned to the upper portion of the first reaction regulation tank 11 by a pump 17 and sprinkled so as to be used for the separation treatment into a waste water and an exhaust gas.

FIG. 16 shows waste water treatment equipment for treating fluorine waste water containing surface active agent, phosphor and hydrogen peroxide using calcium carbonate mineral, slaked lime and coagulant (polychlorinated aluminum and macromolecular coagulant). In this waste water treatment equipment, a calcium carbonate mineral 23 is placed in a second water tank 22 for the purpose of reducing the amount of waste generated from the waste water treatment equipment. Then, the calcium carbonate mineral 23 and the fluorine in the waste water are made to react with each other. However, the fluorine concentration in the waste water is not stabilized below 8 ppm, and therefore, the slaked lime, polychlorinated aluminum or macromolecular coagulant serving as the coagulant is excessively added as compared with the amount of fluorine in the waste water. The slaked lime is effective particularly for the treatment of phosphor in the waste water. There are further shown a first water tank 21, a blower 24, a third water tank 25 that serves as a slaked lime reaction tank, a fourth water tank 26 tank that serves as a polychlorinated aluminum coagulation tank, a fifth water tank 27 that serves as a macromolecular coagulant reaction tank, a sixth water tank 28 that serves as a sedimentation tank and a seventh water tank 29 that serves as a condensation tank.

However, the aforementioned prior art method for treating the fluorine in the acid waste water by forming slightly-soluble calcium fluoride has had the following problems. That is, a large amount of inorganic coagulant of polychlorinated aluminum or the like or macromolecular coagulant with respect to the amount of fluorine in the waste water in order to reduce the fluorine concentration to the intended concentration in the second step, and the sludge including the unreacted aluminum, macromolecular coagulant and so on is set back to the reaction tank and the coagulation tank in order to reuse the unreacted aluminum and unreacted macromolecular coagulant, which are generated for the above reasons.

However, the stirring by the generic stirrer in the reaction tank and the coagulation tank has a lack of capacity for decomposing the sludge as well as a short retention time. This also leads to the problem that the unreacted chemicals cannot completely be regenerated as calcium ions and aluminum ions from the sludge, resulting in low regeneration efficiency.

As described hereinabove, the waste water treatment method disclosed in the prior art reference of Japanese Patent Laid-Open Publication No. HEI 5-39830 executes agitation by the agitator and air by sending the sludge precipitated in the sedimentation tank back to the reaction tank. However, due to the short retention time in the reaction tank, the method still has a lack of capacity for decomposing the sludge, and this leads to the problem that the regeneration efficiency is low. Further, the waste water treatment method disclosed in the prior art reference of Japanese Patent Laid-Open Publication No. HEI 10-5769 similarly sends the sludge back to the coagulation tank having a short retention time instead of the reaction tank. Therefore, the sludge is not sufficiently decomposed, and this leads to the problem that the regeneration efficiency is low.

As shown in FIG. 14, the waste water treatment equipment disclosed in the prior art reference of Japanese Patent Laid-Open Publication No. HEI 9-174081 does not execute at all the return of the sludge that has been coagulated or precipitated in the second water tank 5 that serves as a coagulation tank or the third water tank 6 that serves as a sedimentation tank to the first water tank for the reuse of the sludge, meaning that the sludge is disposed as a waste with the unreacted chemicals included. Therefore, the chemicals to be used and the waste cannot be reduced at all.

In the waste water treatment equipment disclosed in the prior art reference of Japanese Patent Laid-Open Publication No. HEI 8-57498 shown in FIG. 15, the calcium carbonate mineral 12 is fixed. Therefore, after a long time of operation, the calcium fluoride generated as a consequence of the reaction of the calcium ions released from the calcium carbonate mineral 12 with fluorine accumulates in the gaps and clogs up, consequently worsening the circulation of the waste water, to a problem.

In the case of the waste water treatment equipment for treating the fluorine waste water containing surface active agent, phosphor and hydrogen peroxide by using calcium carbonate mineral, slaked lime and coagulant (polychlorinated aluminum and macromolecular coagulant) as shown in FIG. 16, there are the following problems.

That is, in the second water tank 22, to release calcium from the calcium carbonate mineral 23 by acid and make the calcium efficiently react with the fluorine in the fluorine waste water containing surface active agent, phosphor and hydrogen peroxide, two blowers 24 are provided for aeration stirring at a rate of about 120 $m^3$/day per 1 $m^3$. However, if the two blowers 24 are operated, the charge for electricity increases to cause the problem that the running cost increases. However, if the aeration stirring is operated at a rate of 60 $m^3$/day per 1 $m^3$, then the efficiency of reaction of the waste water with the calcium carbonate mineral 23 is low, and this leads to the problem that the fluorine concentration in a separation chamber 30 at the exit of the second water tank 22 consequently is achieved by one half or lower than one half the target value (for example, assuming that the target value of the fluorine concentration is 20 ppm, then the fluorine concentration in the separation chamber 30 becomes equal to or higher than 40 ppm).

Furthermore, it is required to dehydrate the sludge including the unreacted chemicals (i.e., sludge including hydroxides of aluminum and calcium). Therefore, a plurality of filter press units 31 and 32 are needed and the operation time thereof is long, for which the charge for electricity also increases to cause the problem that the running cost increases.

Furthermore, the surface active agent that serves as an organic matter in the waste water is somewhat decomposed by the aerobic microorganisms in the second water tank 22. However, for the reason that the microorganic concentration in the second water tank 22 is low and the biodegradability of the surface active agent is bad, there is the problem that the surface active agent cannot sufficiently be decomposed and removed. Specifically, the extraction ratio of the surface active agent in the second water tank 22 is intended to be 50% or higher, however, the current practice is unable to secure 50%. The hydrogen peroxide in the waste water is more or less decomposed by the anaerobic microorganisms propagating in the third water tank 25 through the sixth water tank 28, whereas the extraction ratio of the hydrogen peroxide is not greater than 50%.

The extraction ratio of phosphor in the waste water can be secured at a rate of not smaller than 90% since the slaked lime is added to the third water tank 25. However, in order to secure the extraction ratio of 90%, there is the problem that the slaked lime must be excessively added more than is needed for phosphor in the waste water. In this case, the reason why the slaked lime is excessively added is that the unreacted slaked lime flows out of the third water tank 25 to the fourth water tank 26 since the slaked lime tends to easily flow without sinking when added to the third water tank 25 and the reaction time continues shortly within one hour. The same thing can be said for not only the slaked lime but also the polychlorinated aluminum added to the fourth water tank 26 and the macromolecular coagulant added to the fifth water tank 27. Therefore, as a result, the unreacted slaked lime sludge and the unreacted coagulant sludge (i.e., hydroxide sludge of calcium hydroxide, aluminum hydroxide and so on) attributed to the slaked lime, polychlorinated aluminum and macromolecular coagulant exist in the sludge precipitated in the sixth water tank 28, consequently causing an increase in the amount of generated sludge.

That is, in the waste water treatment equipment shown in FIG. 16, the amount of generated sludge (amount of sludge) is reduced as compared with the waste water treatment method for executing treatment with the slaked lime and coagulant without using the calcium carbonate mineral 23. However, the unreacted slaked lime and the unreacted coagulant are left in the sludge, meaning that this waste water treatment method is not most appropriate in the current age of waste reduction. Therefore, the reuse of the unreacted slaked lime and the unreacted coagulant emerges as a big problem.

SUMMARY OF THE INVENTION

Accordingly, the object of the present invention is to provide a waste water treatment method and waste water treatment equipment that has a high efficiency of reuse of unreacted chemicals and generates a small amount of unreacted chemical sludge.

In order to achieve the aforementioned object, the present invention provides a waste water treatment method for treating fluorine waste water containing organic matter, phosphor and hydrogen peroxide by means of a mixture of an inorganic sludge, an organic sludge, a biotic sludge and a calcium carbonate mineral.

According to the above invention, first, the fluorine in the fluorine waste water containing organic matter, phosphor and hydrogen peroxide reacts with the calcium released from the calcium carbonate mineral so as to be treated as slightly-soluble calcium fluoride. Then, the calcium fluoride that becomes the core of the minute floc is coagulated by the unreacted coagulant in the inorganic sludge and the unreacted macromolecular coagulant in the organic sludge. Further, by the unreacted slaked lime in the inorganic sludge, the phosphor in the waste water is treated as calcium phosphate. By the microorganisms in the biotic sludge, the organic matter in the waste water is biologically treated. Furthermore, the hydrogen peroxide in the waste water is treated by the biotic sludge. The fluorine, phosphor, organic matter and hydrogen peroxide in the waste water are treated by the inorganic sludge, the organic sludge and the biotic sludge. This allows the reduction in amount of the calcium carbonate mineral and other chemicals to be mixed in the mixed sludge and is able to reduce the amount of generation of the unreacted chemical sludge.

In an embodiment of the present invention, the inorganic sludge is sludge including unreacted slaked lime and unreacted polychlorinated aluminum, the organic sludge is sludge including an unreacted macromolecular coagulant, and the biotic sludge is sludge including microorganisms.

According to the above embodiment, the phosphor in the waste water is treated by the unreacted slaked lime in the inorganic sludge, and the minute calcium fluoride is coagulated into small flocs by the unreacted polychlorinated aluminum. Further, the small calcium fluoride flocs are coagulated into larger flocs by the unreacted macromolecular coagulant in the organic sludge. The organic matter is treated by the microorganisms in the biotic sludge. By reusing the slaked lime, polychlorinated aluminum and macromolecular coagulant in the sludge, the amount of use of the slaked lime, polychlorinated aluminum and macromolecular coagulant is reduced, and the amount of generation of sludge is reduced. Furthermore, the extraction ratio of the surface active agent having low biodegradability is increased.

In an embodiment of the present invention, the microorganisms are anaerobic microorganisms.

According to the above embodiment, the hydrogen peroxide in the waste water is treated by the reducibility owned by the anaerobic microorganisms. The hydrogen peroxide in the waste water is treated at low cost by the reducibility owned by the anaerobic microorganisms without adding any reductant such as sodium bisulfite nor using any catalyst such as activated carbon.

In an embodiment of the present invention, the inorganic sludge, the organic sludge and the biotic sludge are return sludge from a sedimentation tank of waste water treatment equipment.

According to the above embodiment, the inorganic sludge, organic sludge and biotic sludge, included in the return sludge from the sedimentation tank of the waste water treatment equipment, are concentrated to some extent in the sedimentation tank. Therefore, the waste water is efficiently treated by the condensed return sludge. Further, the biotic sludge in the return sludge has become the biotic sludge comprised mainly of the anaerobic microorganisms. Therefore, the hydrogen peroxide in the waste water is treated by the reducibility owned by the anaerobic microorganisms. Further, by using the return sludge from the sedimentation tank of the waste water treatment equipment, recycle type waste water treatment equipment is constructed to allow the reduction of the chemicals to be used and the waste sludge.

The present invention also provides waste water treatment equipment, comprising:

a first water tank into which fluorine waste water containing organic matter, phosphor and hydrogen peroxide is introduced;

a second water tank which has a stirring means and contains a calcium carbonate mineral and into which a return sludge is introduced;

a third water tank to which slaked lime is added;

a fourth water tank to which polychlorinated aluminum is added;

a fifth water tank to which a macromolecular coagulant is added;

a sixth water tank that functions as a sedimentation tank; and a seventh water tank that functions as a condensation tank.

According to the above invention, if the fluorine waste water containing surface active agent, phosphor and hydrogen peroxide is introduced into the second water tank, then in the first step, the fluorine in the waste water is primarily treated as a minute calcium fluoride by the calcium carbonate mineral placed in the second water tank. Next, in the second step, the fluorine in the waste water is secondarily treated by the unreacted slaked lime, coagulant and so on in the return sludge. As described above, the fluorine is treated in two steps in the second water tank. Therefore, the primary treatment in the first step is not required to be as complete as the conventional treatment with only the calcium carbonate mineral, so that the degree of stirring by the stirring means of the second water tank is reduced further than in the conventional case of the treatment with only the calcium carbonate mineral. Further, the organic matter and the hydrogen peroxide in the waste water are treated by the biotic sludge included in the return sludge. That is, the surface active agent in the waste water is treated by means of the microorganisms in the return sludge; and reduction treatment of the hydrogen peroxide in the waste water is achieved by means of the anaerobic microorganisms in the return sludge.

Next, in the third water tank, the phosphor in the waste water is treated as a minute calcium phosphate by the added slaked lime. Furthermore, in the third water tank, the tertiary treatment of the fluorine in the waste water is executed by the added slaked lime, so that the fluorine is more highly treated. Further, in the fourth water tank, the minute calcium fluoride is coagulated by the added polychlorinated aluminum, so that the floc of the calcium fluoride gains an increased strength. In this case, the above increase in strength means the formation of a floc that tends to easily precipitate with an improved shape. Further, in the fifth water tank, the floc of the calcium fluoride becomes a larger floc by the added macromolecular coagulant. Furthermore, the anaerobic state is completely maintained in the seventh water tank that serves as a condensation tank, and therefore, the anaerobic microorganisms are cultured on the basis of the small amount of organic matter. Therefore, by utilizing the condensed sludge in the seventh water tank as the return sludge, the treatment of the surface active agent and the hydrogen peroxide is executed more effectively.

Furthermore, since the return sludge is introduced into the second water tank as described hereinabove, the unreacted chemicals in the return sludge are reused in the second water tank, and this allows the reduction in amount of chemicals to be used. The amount of unreacted chemical sludge discharged from the seventh water tank can also be reduced. Therefore, the number of the filter press unit and the operation time thereof for dehydration use installed in the subsequent stage are reduced, so that the sludge obtained through dehydration as a generated waste is reduced.

In an embodiment of the present invention, waste water treatment equipment comprises a sludge returning means for sending sludge precipitated in the sixth water tank back to an upper portion of the second water tank.

According to the above embodiment, the sludge precipitated in the sixth water tank is returned to the upper portion of the second water tank, so that the unreacted chemical sludge zone is constructed in the upper portion of the second water tank under the condition of a small amount of stirring air of the stirring means. Then, the waste water slowly moves upward from the lower portion of the second water tank, so that the reaction securely progresses in the unreacted chemical sludge zone. Also, the stirring energy of the stirring means is reduced as compared with the case where only the calcium carbonate mineral having the great specific gravity is placed.

In an embodiment of the present invention, the waste water treatment equipment comprises a sludge returning means for sending sludge condensed in the seventh water tank back to an upper portion of the second water tank.

According to the above embodiment, the condensed sludge sufficiently condensed in the seventh water tank is returned to the upper portion of the second water tank, so that the unreacted chemical sludge zone is constructed of the highly condensed sludge in the upper portion of the second water tank. By making the waste water introduced into the second water tank slowly pass through the inside of the high-concentration unreacted chemical sludge zone, the organic matter, phosphor, hydrogen peroxide and fluorine in the waste water are more efficiently treated.

In an embodiment of the present invention, the waste water treatment equipment comprises sludge returning means for sending sludge precipitated in the sixth water tank back to an upper portion of the second water tank and the third water tank.

According to the above embodiment, the sludge including the unreacted chemicals and the biotic sludge is returned to both the upper portion of the second water tank and the third water tank. Therefore, in the second water tank, the treatment of fluorine by the unreacted slaked lime, coagulant and so on in the return sludge and the treatment of the organic matter and the hydrogen peroxide by the biotic sludge in the return sludge are executed. Further, in the third water tank, the treatment of phosphor is executed by the unreacted slaked lime in the return sludge. Thus, the amount of slaked lime to be added to the third water tank is reduced. Therefore, the unreacted chemicals in the return sludge are further reused. Furthermore, by virtue of the existence of the unreacted coagulant and so on in the return sludge, the amount of polychlorinated aluminum to be added to the fourth water tank and the amount of macromolecular coagulant to be added to the fifth water tank are reduced.

In an embodiment of the present invention, the waste water treatment equipment comprises a sludge returning means for sending sludge condensed in the seventh water tank back to an upper portion of the second water tank and the third water tank.

According to the above embodiment, the highly condensed sludge including the unreacted chemicals and the highly condensed biotic sludge, which have been condensed in the seventh water tank that serves as a condensation tank, are returned to both the upper portion of the second water tank and the third water tank. Therefore, the reaction efficiencies of the treatment of fluorine by the unreacted slaked lime, coagulant and so on in the return sludge and the treatment of the organic matter and the hydrogen peroxide by the biotic sludge in the return sludge are increased in the second water tank. Further, the reaction efficiency of phosphor by the unreacted slaked lime in the return sludge is increased in the third water tank. Furthermore, by virtue of the existence of the unreacted slaked lime, unreacted coagulant and so on in the high-concentration return sludge, the amount of slaked lime to be added to the third water tank, the amount of polychlorinated aluminum to be added to the fourth water tank and the amount of macromolecular coagulant to be added to the fifth water tank are remarkably reduced.

In an embodiment of the present invention, the stirring means is a pneumatic stirring means for blowing out air.

According to the above embodiment, the stirring means is the pneumatic stirring means. Therefore, the waste water is stirred and the microorganisms in the air are supplied via the pneumatic stirring means to the second water tank, so that the aerobic microorganisms propagate. Therefore, the organic matter such as the surface active agent in the waste water is biologically treated. Further, differently from the general stirrer, the pneumatic stirring means, which has the operation of decomposing the sludge by air bubbles, is appropriate for the case where the unreacted chemicals in the return sludge are reused. Furthermore, by the operation of the pneumatic stirring means for decomposing the return sludge by air bubbles, there are effectively executed the release of calcium ions from the slaked lime and the calcium carbonate mineral in the return sludge, the release of aluminum ions from the polychlorinated aluminum, the reaction of the fluorine in the waste water with the calcium ions, the growth of the formed calcium fluoride into stabilized flocs and so on.

In an embodiment of the present invention, the second water tank is constructed of: an upper portion in which a mixed sludge zone comprised of an inorganic sludge, an organic sludge and a biotic sludge is formed on the basis of the introduced return sludge; and a lower portion in which the waste water from the first water tank is introduced and a calcium carbonate mineral zone is formed on the basis of the contained calcium carbonate mineral.

According to the above embodiment, the fluorine in the waste water is treated in both the calcium carbonate mineral zone of a specific gravity of 2.7 formed in the lower portion of the second water tank and the mixed sludge zone of a specific gravity close to one formed in the upper portion of the second water tank. Therefore, the stirring energy of the stirring means is reduced as compared with the case of the treatment by only the calcium carbonate mineral having a great specific gravity, so that the charge for electricity is saved. Further, the mixed sludge zone is constructed of a mixed sludge comprised of the inorganic sludge, the organic sludge and the biotic sludge. Therefore, the organic matter such as the surface active agent in the waste water is treated by the biotic sludge, the phosphor in the waste water is treated by the inorganic sludge including the slaked lime, and the hydrogen peroxide in the waste water is treated by the reducibility of the anaerobic microorganisms in the biotic sludge. Consequently, the charge for chemicals to be added is saved. Further, the mixed sludge, which includes the unreacted coagulant, has good sludge cohesiveness and hence good settleability. Therefore, even when the sludge is somewhat stirred, the mixed sludge zone is be formed.

In an embodiment of the present invention, the stirring means has a control section for controlling an intensity of stirring on the basis of a control signal, and a pH meter that measures pH is provided in the upper portion of the second water tank so as to send a control signal according to a measured value to the control section of the stirring means.

According to the above embodiment, the pH meter is provided in the upper portion of the second water tank, and the intensity of stirring of the stirring means is controlled by the control section on the basis of the control signal according to the measured value from this pH meter. Thus, the above reaction progresses with a smaller quantity of energy. In the above case, if the water quality of the raw water to be introduced is suddenly degraded and the water quality in the upper portion of the second water tank is consequently degraded, then the degree of stirring of the stirring means is increased by the pH meter and the control section to promote the reaction, preventing the degradation of the water quality.

In an embodiment of the present invention, the biotic sludge constituting the mixed sludge zone in the upper portion of the second water tank includes both anaerobic microorganisms and aerobic microorganisms.

According to the above embodiment, the biotic sludge constituting the mixed sludge zone includes both the anaerobic microorganisms and the aerobic microorganisms, and therefore, the denitrification of the nitrate nitrogen in the waste water is executed by utilizing the reducibility owned by the anaerobic microorganisms. Further, the hydrogen peroxide that serves as an oxidizing agent is also treated by utilizing the reducibility owned by the anaerobic microorganisms. The organic matter such as the surface active agent in the waste water is treated by the aerobic microorganisms.

The present invention also provides the waste water treatment equipment comprising: a first water tank into which fluorine waste water containing organic matter, phosphor and hydrogen peroxide is introduced;

a second water tank which has a stirring means and contains a calcium carbonate mineral;

an unreacted chemical reaction tank which has a stirring means and in which a return sludge is introduced and reaction by means of unreacted chemicals in the return sludge is executed;

a third water tank to which slaked lime is added;

a fourth water tank to which polychlorinated aluminum is added;

a fifth water tank to which a macromolecular coagulant is added;

a sixth water tank that functions as a sedimentation tank; and a seventh water tank that functions as a condensation tank.

According to the above invention, the waste water is treated by the return sludge that includes the unreacted chemicals without any new chemical in the unreacted chemical reaction tank. Therefore, the amount of use of the new chemicals is reduced to allow the treatment cost to be reduced. Further, by virtue of the reuse of the unreacted chemicals in the return sludge, the amount of generated sludge as a waste is reduced.

In an embodiment of the present invention, the waste water treatment equipment comprises a sludge returning means for sending at least one of the sludge precipitated in the sixth water tank and the sludge condensed in the seventh water tank back to the unreacted chemical reaction tank.

According to the above embodiment, the sludge is returned to the unreacted chemical reaction tank from at least one of the sixth water tank that serves as a sedimentation tank and the seventh water tank that serves as a condensation tank. Therefore, the treatment of the waste water by means of the unreacted chemicals included in the return sludge from the sixth water tank or the treatment of the waste water by means of the highly condensed return sludge from the seventh water tank is increased in efficiency. Further, the return sludge is a mixed sludge, and therefore, the waste water is subjected to both the chemical treatment and the biotic treatment, so that the chemical components such as fluorine and phosphor and the organic matter such as the surface active agent in the waste water are concurrently treated.

In an embodiment of the present invention, the second water tank and the unreacted chemical reaction tank are connected in series with each other, and the waste water is treated by the unreacted chemical reaction tank subsequently to the second water tank.

According to the above embodiment, the fluorine in the waste water is treated in the second water tank containing the calcium carbonate mineral. Subsequently, in the unreacted chemical reaction tank into which the return sludge is introduced, the fluorine in the waste water is highly treated by the unreacted chemicals (i.e., the unreacted slaked lime, the unreacted polychlorinated aluminum and the unreacted macromolecular coagulant) in the return sludge without using any new chemical, so that the phosphor and the organic matter in the waste water are treated. Thus, the waste to be generated is consequently reduced.

Further, the waste water is treated in two stages in the second water tank and the unreacted chemical reaction tank. Therefore, the total amount of the stirring energy is further reduced than in the case of the one-stage treatment for executing the treatment with only the calcium carbonate mineral having a great specific gravity (specific gravity: 2.7). That is, since the specific gravity of the return sludge in the unreacted chemical reaction tank is close to one, there is needed less stirring energy than in the case where the calcium carbonate mineral having a specific gravity of 2.7 is stirred. This means that the total energy for stirring the calcium carbonate mineral is allowed to be about one half.

Even if the fluorine treatment and phosphor treatment in the second water tank are incomplete or even if the organic matter treatment and hydrogen peroxide treatment cannot be executed in the second water tank, then the advanced treatment of the fluorine and phosphor and the treatment of the organic matter and hydrogen peroxide are executed by the unreacted chemicals and the microorganisms in the return sludge in the unreacted chemical reaction tank. Therefore, the running cost and the generation of sludge are reduced.

In an embodiment of the present invention, the waste water treatment equipment comprises a sludge returning means for sending at least one of the sludge precipitated in the sixth water tank and the sludge condensed in the seventh water tank back to the unreacted chemical reaction tank.

According to the above embodiment, the sludge is returned to the unreacted chemical reaction tank from at least one of the sixth water tank that serves as a sedimentation tank and the seventh water tank that serves as a condensation tank. Therefore, the treatment of the waste water by means of the unreacted chemicals included in the return sludge from the sixth water tank or the treatment of the waste water by means of the highly condensed return sludge from the seventh water tank is increased in efficiency. Further, the return sludge is a mixed sludge, and therefore, the waste water is subjected to both the chemical treatment and the biotic treatment, so that the chemical components such as fluorine and phosphor and the organic matter such as the surface active agent in the waste water are concurrently treated.

In an embodiment of the present invention, the unreacted chemicals included in the return sludge are regenerated in the unreacted chemical reaction tank to treat the waste water.

According to the above embodiment, the waste water is treated by regenerating the unreacted chemicals included in the return sludge. Therefore, the amount of use of the chemicals is reduced and the sludge of, for example, the hydroxide (i.e., the calcium hydroxide in the case of the slaked lime and the aluminum hydroxide in the case of the polychlorinated aluminum) attributed to the unreacted chemicals is reduced, so that the sludge as a waste is reduced. That is, according to the present embodiment, the reduction in running cost of the whole waste water treatment equipment and the effective use of the resources are achieved.

In an embodiment of the present invention, the regeneration of the unreacted chemical is executed by mixing acid waste water with the return sludge and stirring the mixture.

According to the above embodiment, the calcium ions and the aluminum ions, which contribute as a chemical to the reaction, are released from the return sludge into the waste water by the acid in the acid waste water and reused for the treatment of the fluorine and phosphor in the waste water. Therefore, the effective use of the resources and the reduction in running cost are achieved without necessitating any new chemicals.

In an embodiment of the present invention, the stirring means in the unreacted chemical reaction tank is a pneumatic stirring means for blowing out air.

According to the above embodiment, the return sludge is surely decomposed by the pneumatic stirring (aeration), so that the calcium ions and aluminum ions are easily released and the reaction of the fluorine and phosphor in the waste water with the released calcium ions and aluminum ions is promoted. Further, the aeration enables the culturing and propagation of the aerobic microorganisms together with the stirring.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B are tables showing treatment timing of the waste water treatment equipment shown in FIG. 1;

FIG. 3 is a view showing the construction of waste water treatment equipment different from FIG. 1;

DETAILED DESCRIPTION OF THE PREFERRED EMBODIMENTS

Figure 1:
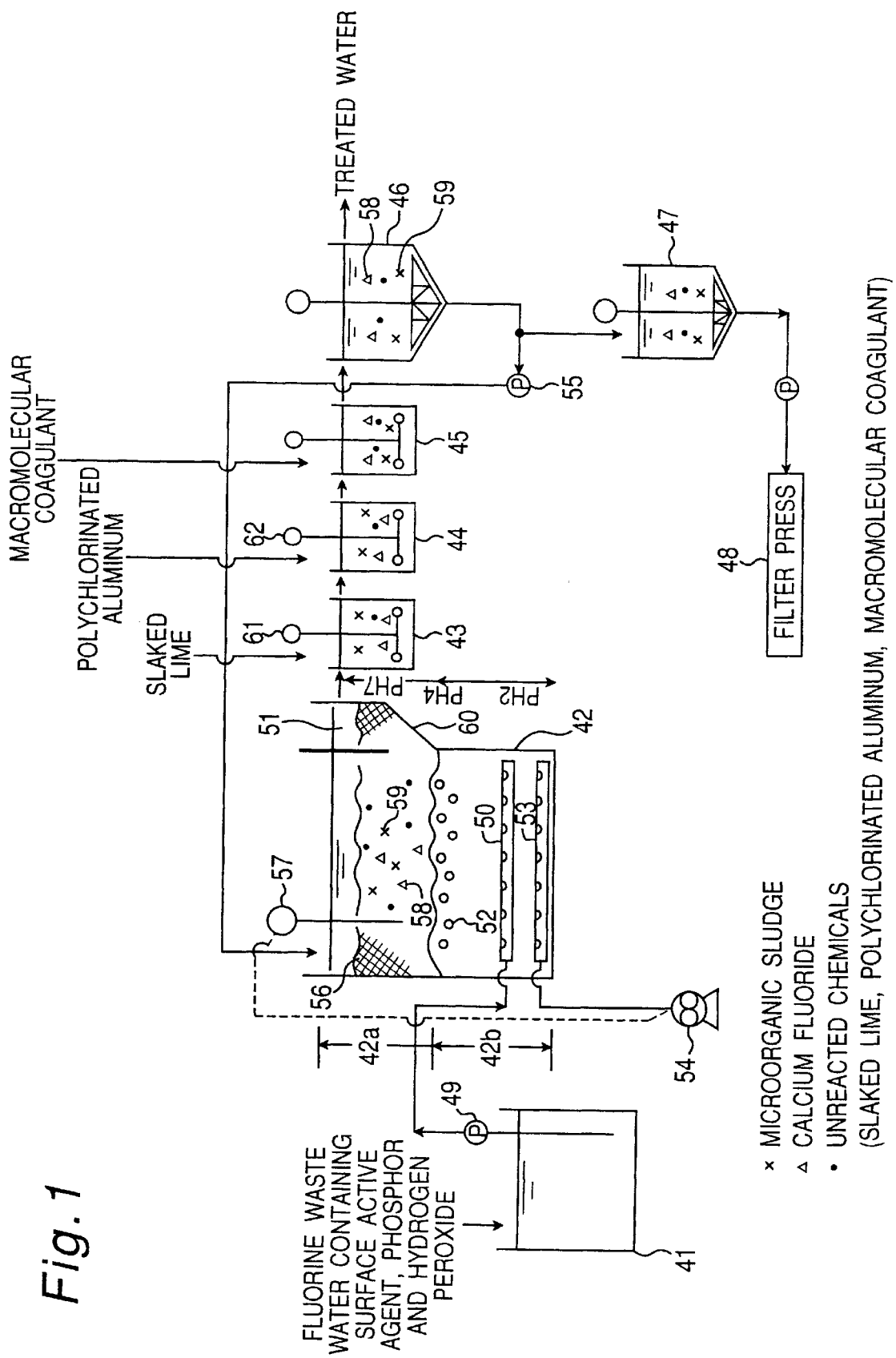
FIG. 1 is a view showing an example of construction of waste water treatment equipment of the present invention.

The present invention will be described in detail below on the basis of the embodiments thereof shown in the drawings.

First Embodiment

FIG. 1 is a schematic view of waste water treatment equipment of the present embodiment. This waste water treatment equipment generally treats fluorine waste water containing surface active agent, phosphor and hydrogen peroxide discharged from production processes of a semiconductor plant or a liquid crystal plant while assuring a small amount of waste and energy conservation by efficiently reusing unreacted slaked lime and coagulant.

The present waste water treatment equipment is constructed roughly of a first water tank 41, a second water tank 42, a third water tank 43, a fourth water tank 44, a fifth water tank 45, a sixth water tank 46, a seventh water tank 47 and a filter press 48. The first water tank 41 is supplied with fluorine waste water containing surface active agent, phosphor and hydrogen peroxide from a waste water pipe. Then, the waste water supplied to the first water tank 41 is introduced into a lower portion 42b of the second water tank 42 from a lower inflow pipe 50 provided in a bottom portion of the second water tank 42 by a first water tank pump 49.

The second water tank 42 has an upper portion 42a and a separation chamber 51 located adjacent to the upper portion 42a. It is to be noted that a boundary position between the upper portion 42a and the lower portion 42b is the position where the waste water is divided into about halves in amount. The lower portion 42b is internally provided with a granular calcium carbonate mineral 52 that has a particle diameter of approximately 0.5 mm and occupies about 40% to 80% of the capacity of the lower portion 42b in a flowing state. Then, a plurality of air diffusion pipes 53 are arranged at the bottom, and the pipes are connected to a blower 54 by way of an air pipe. That is, the blower 54, the air pipe and the air diffusion pipes 53 constitute an aerating means, thereby maintaining the calcium carbonate mineral 52 in the flowing state by the air blow from the air diffusion pipes 53.

In this case, since a large amount of calcium carbonate mineral 52 is placed and the mineral has a specific gravity of 2.7, a weak flowing state can be maintained by adjusting the amount of aeration air discharged from the air diffusion pipes 53 to a low rate. Then, calcium is released from the calcium carbonate mineral 52 by the acid of hydrofluoric acid, sulfuric acid, nitric acid, phosphoric acid and so on included in the fluorine waste water containing surface active agent, phosphor and hydrogen peroxide introduced by way of the first water tank 41.

Sludge precipitated in the sixth water tank 46 that serves as a sedimentation tank is returned to the upper portion 42a of the second water tank 42 by a sedimentation tank sludge return pump 55, and a layer of the returned sludge forms an unreacted chemical sludge zone 56. Then, if the amount of sludge in the unreacted chemical sludge zone 56 becomes equal to or greater than a specified amount, then height of the unreacted chemical sludge zone 56 increases to flow the sludge from the separation chamber 51 into the third water tank 43. It is to be noted that this unreacted chemical sludge zone 56 is formed for the reason that the aeration of the upper portion 42a is weak, the reason that the return sludge is sludge having a good settleability and the reason that the upper portion 42a has the separation chamber 51. In this case, the reason for the good settleability of the return sludge is that it is generated by the coagulant.

In the unreacted chemical sludge zone 56 is inserted a detecting portion of a pH meter 57, and its detection signal is inputted to a drive control section (not shown) of the blower 54. Then, if a pH value of the influent water becomes low to make the pH value in the upper portion 42a not greater than four, then the number of revolutions of the blower 54 is inverter controlled on the basis of a detection signal so as to increase, by which an air flow rate of the blower 54 is increased to maintain the pH value in the upper portion 42a at and around five.

The sludge (i.e., the sludge constituting the unreacted chemical sludge zone 56) precipitated in the sixth water tank 46 that serves as a sedimentation tank is an aggregate of the following substances:

(1) calcium fluoride 58 generated through the reaction of the fluorine in the waste water with the calcium carbonate mineral 52;

(2) calcium fluoride 58 generated through the reaction of the fluorine with the slaked lime added to the third water tank 43 and unreacted slaked lime;

(3) aluminum fluoride generated through the reaction of the fluorine with polychlorinated aluminum added to the fourth water tank 44, unreacted polychlorinated aluminum and a large amount of hydroxide (aluminum hydroxide) of the polychlorinated aluminum;

(4) flocs attributed to macromolecular coagulant added to the fifth water tank 45 and unreacted macromolecular coagulant; and (5) microorganic sludge 59 generated through processes from the second water tank 42 to the sixth water tank 46.

A water level of the waste water in the second water tank 42 is adjusted so that the unreacted chemical sludge zone 56 of the upper portion 42a surely sinks. For this purpose, when the particle diameter of the calcium carbonate mineral 52 is 0.5 mm, it is proper to set the air flow rate of a blower 54 to 30–60 $m^3$/day per volume of 1 $m^3$ of the second water tank 42. This air flow rate is about one half that in the case where no unreacted chemical sludge zone is formed as in the prior art waste water treatment equipment shown in FIG. 16.

Thus, by the weak air blow from the air diffusion pipes 53, the unreacted chemical sludge zone 56 in the upper portion 42a of the second water tank 42 and the calcium carbonate mineral 52 in the lower portion 42b are set in a weak flowing state. Then, the fluorine in the waste water introduced from the lower inflow pipe 50 into the lower portion 42b reacts with the calcium carbonate mineral 52, thereby executing the primary treatment of the fluorine as a consequence of the generation of the calcium fluoride 58 in a floc form. Then, the waste water is introduced into the unreacted chemical sludge zone 56 and treated through the reactions as follows.

(1) Calcium ions and aluminum ions are released from the unreacted slaked lime and the unreacted coagulant in the return sludge by the weak acid waste water obtained after the calcium carbonate mineral treatment and by the aeration.

(2) Untreated fluorine in the waste water reacts with the calcium ions released through the above treatment (1) to become the calcium fluoride 58 in the flock form (secondary treatment of fluorine).

(3) The calcium fluoride 58 in the flock form generated through the above treatment (2) is formed into a large shaped floc having a good settleability by the operation of the aluminum ions released through the treatment (1) and the unreacted macromolecular coagulant.

(4) The organic matter such as the surface active agent in the waste water is biologically treated by the microorganisms in the high-concentration microorganic sludge 59.

(5) The phosphor in the waste water reacts with the unreacted slaked lime to become calcium phosphate and is formed into a large floc by the operation of the unreacted coagulant.

(6) The hydrogen peroxide in the waste water is treated by the reducibility owned by the anaerobic microorganisms in the microorganic sludge 59.

The reason why the anaerobic microorganisms propagate regardless of the aeration of the unreacted chemical sludge zone 56 in the upper portion 42a of the second water tank 42 is that the aeration is a weak aeration as described hereinabove and oxygen attributed to the aeration is immediately consumed since the concentration of the microorganic sludge 59 is high, consequently causing an uneven distribution of the dissolved oxygen depending on places. Then, there appear the anaerobic microorganisms living in the places where no dissolved oxygen exists and the aerobic microorganisms living in the places where dissolved oxygen exists, and they coexist in the unreacted chemical sludge zone 56.

The anaerobic microorganisms do not immediately become extinct even if the habitat environment changes into an aerobic environment, and conversely, the aerobic microorganisms do not immediately become extinct even if the habitat environment changes into an anaerobic environment. That is, the anaerobic microorganisms and the aerobic microorganisms live and propagate together in the coexisting state so long as a state in which the dissolved oxygen scarcely exists (i.e., the state in which the dissolved oxygen concentration is 0 ppm to 1 ppm) continues for a long time, executing the treatment of the hydrogen peroxide and the surface active agent.

As described above, it is preferable to design the second water tank 42 so that the waste water treated in the second water tank 42 becomes neutral at the exit of the separation chamber 51. Specifically, when the waste water pH is not greater than three, it is preferable to design the second water tank 42 so that retention time of the waste water becomes four hours or longer, also depending on the amount of unreacted chemicals in the return sludge.

If an aeration air amount of about 50 $m^3$ a day per volume of 1 $m^3$ of the second water tank 42 is secured, then the waste water cannot be sufficiently stirred in the lower portion 42b. Consequently, the fluorine concentration in the waste water is increased (fluorine is not sufficiently treated) as compared with the case where the aeration air amount is set to 100 $m^3$ or higher a day per volume of 1 $m^3$ of the second water tank 42. However, the fluorine treatment in the lower portion 42b is the primary treatment, and the secondary treatment is subsequently executed by means of the unreacted slaked lime and the unreacted coagulant in the unreacted chemical sludge zone 56 of the upper portion 42a. Therefore, with regard to the whole of the second water tank 42, the fluorine in the waste water can be sufficiently treated to allow a specified fluorine extraction ratio to be achieved.

Figure 16:
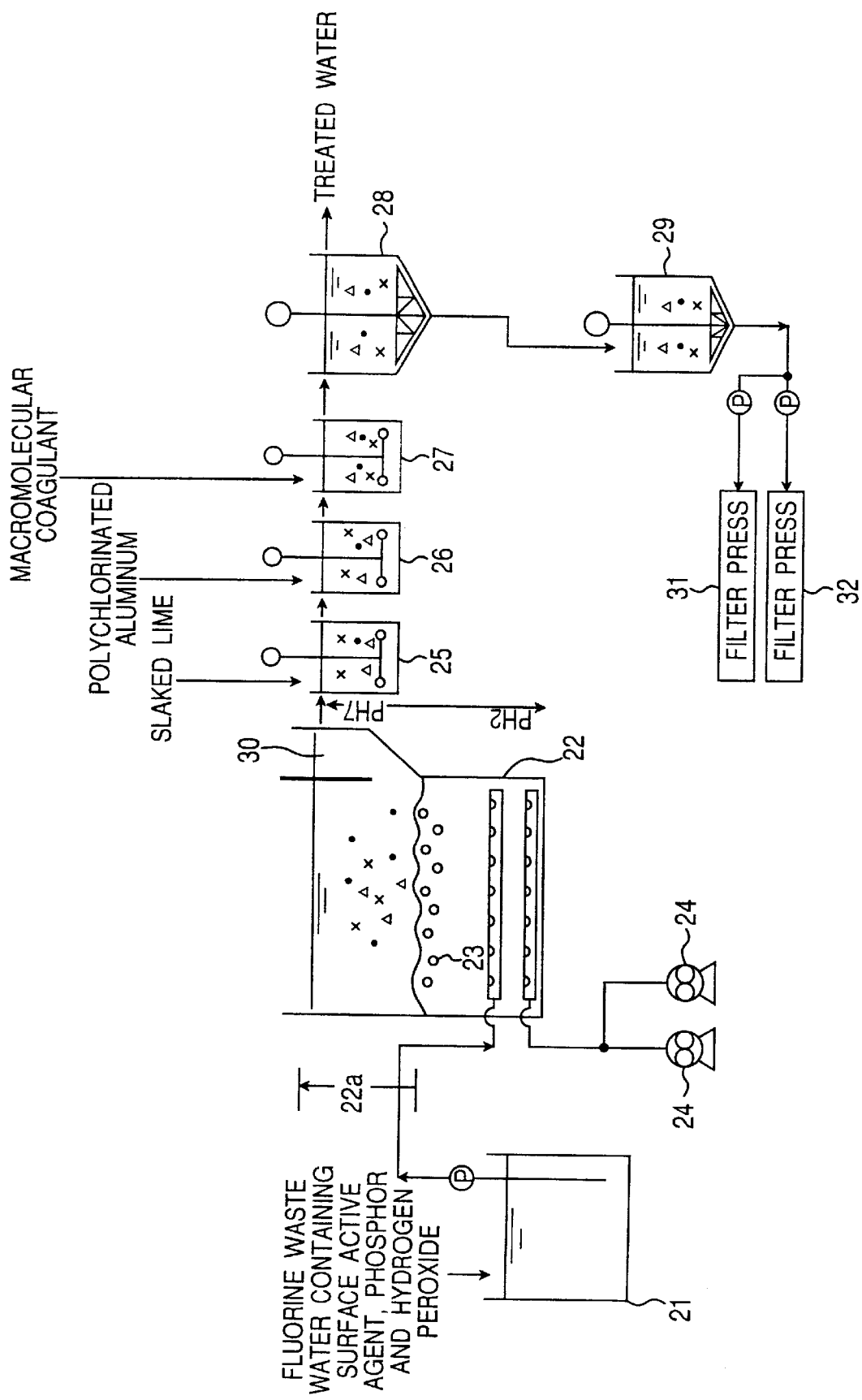
FIG. 16 is a view showing prior art waste water treatment equipment using calcium carbonate mineral.

That is, according to the present embodiment, the specified fluorine extraction ratio can be secured with the aeration air amount of about 50 $m^3$ a day per volume of 1 $m^3$ of the second water tank 42, which is one half the aeration air amount of the prior art waste water treatment equipment shown in FIG. 16. Therefore, energy conservation can be achieved with regard to the energy of electricity.

A bottom surface 60 of the separation chamber 51 is inclined downward and extends to the side wall of the lower portion 42b with no impediment. Therefore, the calcium carbonate mineral 52 having a great specific gravity inside the separation chamber 51 descends along the inclined bottom surface 60, preventing the calcium carbonate mineral 52 from flowing out of the separation chamber 51 toward the third water tank 43. Thus, the calcium fluoride 58 in the floc form having a small specific gravity and the microorganic sludge 59 eventually flow out of the separation chamber 51, whereas the calcium carbonate mineral 52 that serves as a fluorine treating material cannot flow out of the separation chamber 51 of the second water tank 42.

As described above, if the waste water is introduced into the lower portion 42b of the second water tank 42, then the calcium carbonate mineral 52 that is weakly flowing in the calcium carbonate zone in the lower portion 42b reacts with the fluorine in the waste water to treat the fluorine in the waste water, so that the fluorine concentration becomes about 30 ppm (20 ppm or less when the mineral is strongly flowing). The waste water pH comes closer to four (comes closer to seven when the mineral is strongly flowing). The primary treatment of fluorine is thus executed.

Further, the waste water introduced into the unreacted chemical sludge zone 56 of the upper portion 42a of the second water tank 42 is mixed and stirred with the return sludge including the unreacted slaked lime, unreacted polychlorinated aluminum, unreacted macromolecular coagulant and microorganisms, for the execution of the following reactions.

(a) The fluorine at a concentration of 30 ppm in the waste water obtained after the primary treatment reacts with the unreacted slaked lime in the return sludge to become the calcium fluoride 58, and the fluorine concentration in the waste water is further reduced to a concentration of not greater than 15 ppm by the unreacted coagulant. Then, pH of the waste water comes closer to the neutrality.

(b) The surface active agent in the waste water is biologically treated by the high-concentration microorganisms in the return sludge.

(c) The phosphor in the waste water is treated through the reaction with the unreacted slaked lime in the return sludge to become calcium phosphate (primary treatment of phosphor).

(d) The hydrogen peroxide in the waste water is treated by the reducibility owned by the anaerobic microorganisms in the return sludge.

Next, the waste water of which the fluorine, surface active agent, phosphor and hydrogen peroxide have been treated (the treated waste water, in short) is introduced into the third water tank 43 that serves as a slaked lime reaction tank. Specifically, the waste water treated in the second water tank 42 is conveyed to the third water tank 43 by way of an outflow pipe (not shown) provided above the separation chamber 51 of the second water tank 42.

Slaked lime is added to the third water tank 43, and the waste water and the slaked lime are rapidly stirred by a rapid stirrer 61. Thus, the phosphor in the waste water is further treated as a calcium phosphate (secondary treatment of phosphor). It is to be noted that the primary treatment of phosphor is executed through the reaction with the unreacted slaked lime in the upper portion 42a of the second water tank 42. The calcium phosphate in the waste water is treated by being precipitated inside the sixth water tank 46 that serves as a sedimentation tank. By virtue of the addition of the slaked lime, the fluorine in the waste water is further highly treated (tertiary treatment of phosphor). It is to be noted that the phosphor in the waste water does not react with the calcium released from the calcium carbonate mineral 52 with regard to the result of operation of the actual equipment. Therefore, the treatment of phosphor can be scarcely achieved in the lower portion 42b of the second water tank 42.

Subsequently, the waste water is introduced into the fourth water tank 44 that serves as a polychlorinated aluminum tank. To the fourth water tank 44 is added an aluminum agent (polychlorinated aluminum) that serves as a coagulant for forming the cores of flocs, and the waste water and the polychlorinated aluminum are rapidly stirred by a rapid stirrer 62 to generate minute flocs.

To the fifth water tank 45 is added the macromolecular coagulant for enlarging the flocs. The coagulant produces a greater coagulating effect as the waste water pH is closer to the neutrality, when the fluorine and phosphor can be efficiently removed from the waste water.

The waste water that has undergone the treatment in the fifth water tank 45 is then moved to the sixth water tank 46. This sixth water tank 46 executes the same treatment as that of the general sedimentation tank. Then, the seventh water tank 47 that functions as a general sludge condensation tank condenses the sludge from the sixth water tank 46. Then, the condensed sludge is conveyed to the filter press 48 that serves as a dehydrator and dehydrated there.

Although the retention time of the waste water in the second water tank 42 is set to four hours or longer in the present embodiment, the reaction time in the third water tank 43, the fourth water tank 44 or the fifth water tank 45 is permitted to be about 30 minutes. Although the particle diameter of the calcium carbonate mineral 52 is set to approximately 0.5 mm in the present embodiment, it is proper to set the particle diameter within a range of 0.1 mm to 2 mm.

According to the prior art waste water treatment method shown in FIG. 16, the sludge from the sixth water tank 28 is not returned to the second water tank 22. Therefore, no unreacted chemical sludge zone is formed in the second water tank 22. In order to maintain the pH value in the upper portion 22a of the second water tank 22 at and around seven, two blowers 24 and 24 are provided.

Therefore, the present embodiment needs one half the number of blowers and one half the charge for electricity of the waste water treatment equipment shown in FIG. 16, by comparison. That is, the waste water treatment equipment of the present embodiment can be regarded as an energy-saving type waste of water treatment equipment.

As described above, the waste water treatment equipment shown in FIG. 16 is provided with no equipment for sending the sludge from the sixth water tank 28 or the seventh water tank 29 back to the upper portion 22a of the second water tank 22. Therefore, the unreacted slaked lime, the unreacted polychlorinated aluminum and the unreacted macromolecular coagulant are treated as they are to be dehydrated by two filter press units 31 and 32 without being reused. Therefore, the unreacted slaked lime, the unreacted polychlorinated aluminum and the unreacted macromolecular coagulant are included in the sludge, so that the amount of sludge as a waste is great.

In contrast to this, according to the present embodiment, the unreacted slaked lime, the unreacted polychlorinated aluminum and the unreacted macromolecular coagulant are returned to the upper portion 42a of the second water tank 42 so as to be reused. Therefore, the amount of sludge as a waste generated through the dehydration by the filter press 48 is remarkably reduced. As a result, one filter press 48 can sufficiently cope with the waste.

The reason why the amount of sludge is reduced in the present embodiment is that the components in the sludge are dissolved in the waste water (specifically in the form of ions such as calcium ions) since the aeration is executed under a condition of existence of the return sludge in the second water tank 42 and the retention time of the waste water is set to four hours or longer, in addition to the above arrangement. In concrete, assuming that, for example, calcium sulfate exists as a precipitate or sludge, then the calcium sulfate is formed into sulfate ions and calcium ions by the aeration and dissolved in the waste water to reduce the solid matter. It is to be noted that the calcium fluoride 58 generated during the fluorine treatment is slightly soluble and therefore not in the least dissolved by aeration. That is, the purpose of the aeration is to reduce the amount of sludge by leaving only the slightly-soluble calcium fluoride 58 and dissolving the other components to the degree of dissolution of each component, stir the inside of the second water tank 42 and maintain the aerobic microorganisms.

FIGS. 2A and 2B show examples of the timing (elapsed time) of the treatment in the water tanks of the second water tank 42 through the seventh water tank 47. It is to be noted that FIG. 2A shows the case where the concentration of the waste water is normal, while FIG. 2B shows the case where the concentration of the waste water is low.

As described above, in the present embodiment, the sludge is returned from the sixth water tank 46 to the upper portion 42a of the second water tank 42 and weak aeration is executed by the blower 54 and the air diffusion pipe 50. Therefore, the zone of the calcium carbonate mineral 52 is formed in the lower portion 42b of the second water tank 42, while the unreacted chemical sludge zone 56 is formed in the upper portion 42a.

Therefore, in the second water tank 42, there can be executed the operations of:

release of calcium ions and aluminum ions from the unreacted slaked lime and the unreacted coagulant by the aeration stirring in the weak acid waste water;

primary treatment of the fluorine in the waste water by the calcium carbonate mineral 52;

secondary treatment of the fluorine by the unreacted chemicals (slaked lime and coagulant) in the unreacted chemical sludge zone 56;

primary treatment of the phosphor in the waste water by the unreacted slaked lime in the unreacted chemical sludge zone 56;

treatment of the surface active agent in the waste water by the microorganisms in the unreacted chemical sludge zone 56; and reduction treatment of hydrogen peroxide in the waste water by the anaerobic microorganisms in the unreacted chemical sludge zone 56.

In the third water tank 43, the tertiary treatment of the fluorine in the waste water can be executed by the added slaked lime. Further, the secondary treatment of the phosphor in the waste water can be executed. The anaerobic state can be completely maintained in the seventh water tank 47 that serves as a condensation tank, and therefore, the anaerobic microorganisms can be cultured on the basis of the small amount of organic matter. Therefore, by sending back the condensed sludge in the seventh water tank 47 to the unreacted chemical sludge zone 56 of the second water tank 42, the treatment of the surface active agent and the hydrogen peroxide can be more effectively executed.

As described above, the return sludge is introduced into the second water tank 42, and therefore, the chemicals to be used can be reduced in the second water tank 42 through the fifth water tank 45. In addition, the amount of the unreacted chemical sludge discharged from the seventh water tank 47 can be reduced. Therefore, the number of the filter press unit 48 and the operation time thereof can be reduced, so that the sludge obtained as a generated waste through the dehydration can be reduced.

That is, according to the present embodiment, waste water treatment equipment having a high regeneration efficiency of the unreacted chemicals and generates a small amount of unreacted chemical sludge can be achieved. In particular, the surface active agent that will become a hormone disrupter can be treated with high efficiency, so that the waste water treatment conforming to the needs of the current age can be achieved. In addition, the running cost and the consumption of energy can be reduced.

Second Embodiment

FIG. 3 shows a schematic view of waste water treatment equipment of the present embodiment. A first water tank 71, a second water tank 72, a third water tank 73, a fourth water tank 74, a fifth water tank 75, a sixth water tank 76, a seventh water tank 77 and a filter press 78 have the same constructions and functions as those of the first water tank 41, the second water tank 42, the third water tank 43, the fourth water tank 44, the fifth water tank 45, the sixth water tank 46, the seventh water tank 47 and the filter press 48 of the first embodiment. Similar to the case of the first embodiment, sludge precipitated in the sixth water tank 76 is returned to an upper portion 72a of the second water tank 72.

In the present embodiment, the sludge which is condensed by the seventh water tank 77 and in which the anaerobic microorganisms are living at high concentration is returned to the upper portion 72a of the second water tank 72 by a condensation tank sludge return pump 80. With this arrangement, the sludge concentration in an unreacted chemical sludge zone 79 formed of the return sludge from the sixth water tank 76 in the upper portion 72a of the second water tank 72 further increases, with which the waste water treatment efficiency of the objective substances to be treated increases. In particular, with the increase in sludge concentration, the oxygen in the waste water is consumed to propagate the anaerobic microorganisms, for which the treatment of the hydrogen peroxide in the waste water is made remarkable. In regard to the surface active agent that is another objective substance to be treated, the treatment is further secured by the increase in microorganic concentration.

Third Embodiment

Figure 4:
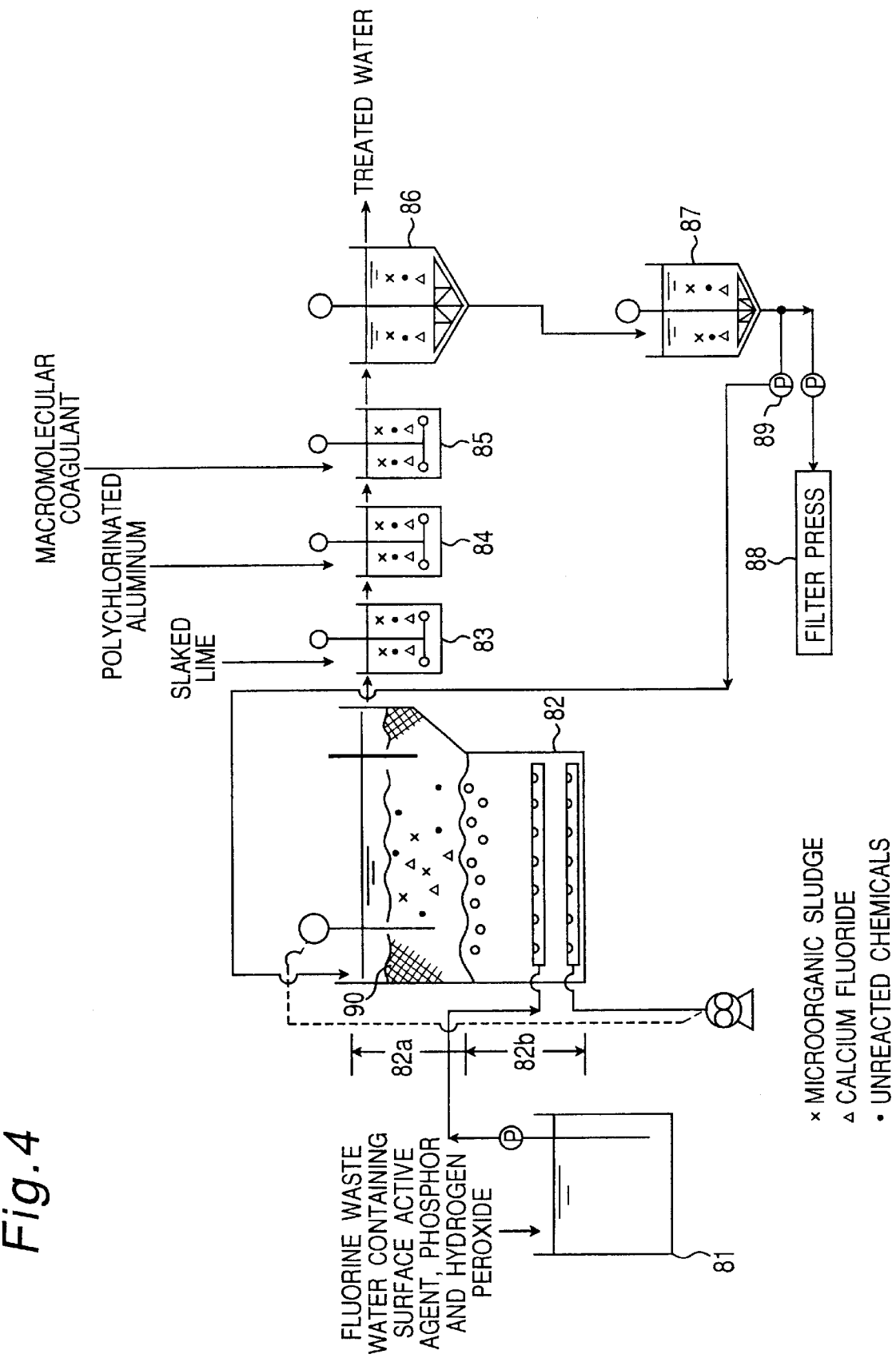
FIG. 4 is a view showing the construction of waste water treatment equipment different from FIG. 1 and FIG. 3.

FIG. 4 is a schematic view of waste water treatment equipment of the present embodiment. A first water tank 81, a second water tank 82, a third water tank 83, a fourth water tank 84, a fifth water tank 85, a sixth water tank 86, a seventh water tank 87 and a filter press 88 have the same constructions and functions as those of the first water tank 41, the second water tank 42, the third water tank 43, the fourth water tank 44, the fifth water tank 45, the sixth water tank 46, the seventh water tank 47 and the filter press 48 of the first embodiment.

In the present embodiment, (a) Sludge precipitated in the sixth water tank 86 is not returned to an upper portion 82a of the second water tank 82, and (b) Sludge condensed in the seventh water tank 87 is returned to the upper portion 82a of the second water tank 82 by a condensation tank sludge return pump 89, and an unreacted chemical sludge zone 90 is formed in the upper portion 82a.

As described above, only the sludge condensed in the seventh water tank 87 is returned to the upper portion 82a of the second water tank 82. Therefore, the sludge concentration in the unreacted chemical sludge zone 90 of the upper portion 82a is increased as compared with the unreacted chemical sludge zones 56 and 79 of the first embodiment and the second embodiment. Therefore, the waste water treatment efficiency of the objective substance to be treated is increased. In particular, with the increase in sludge concentration, the oxygen in the waste water is consumed to propagate the anaerobic microorganisms, for which the treatment of the hydrogen peroxide in the waste water is made remarkable. In regard to the surface active agent that is another objective substance to be treated, the treatment is further secured by the increase in microorganic concentration.

Fourth Embodiment

Figure 5:
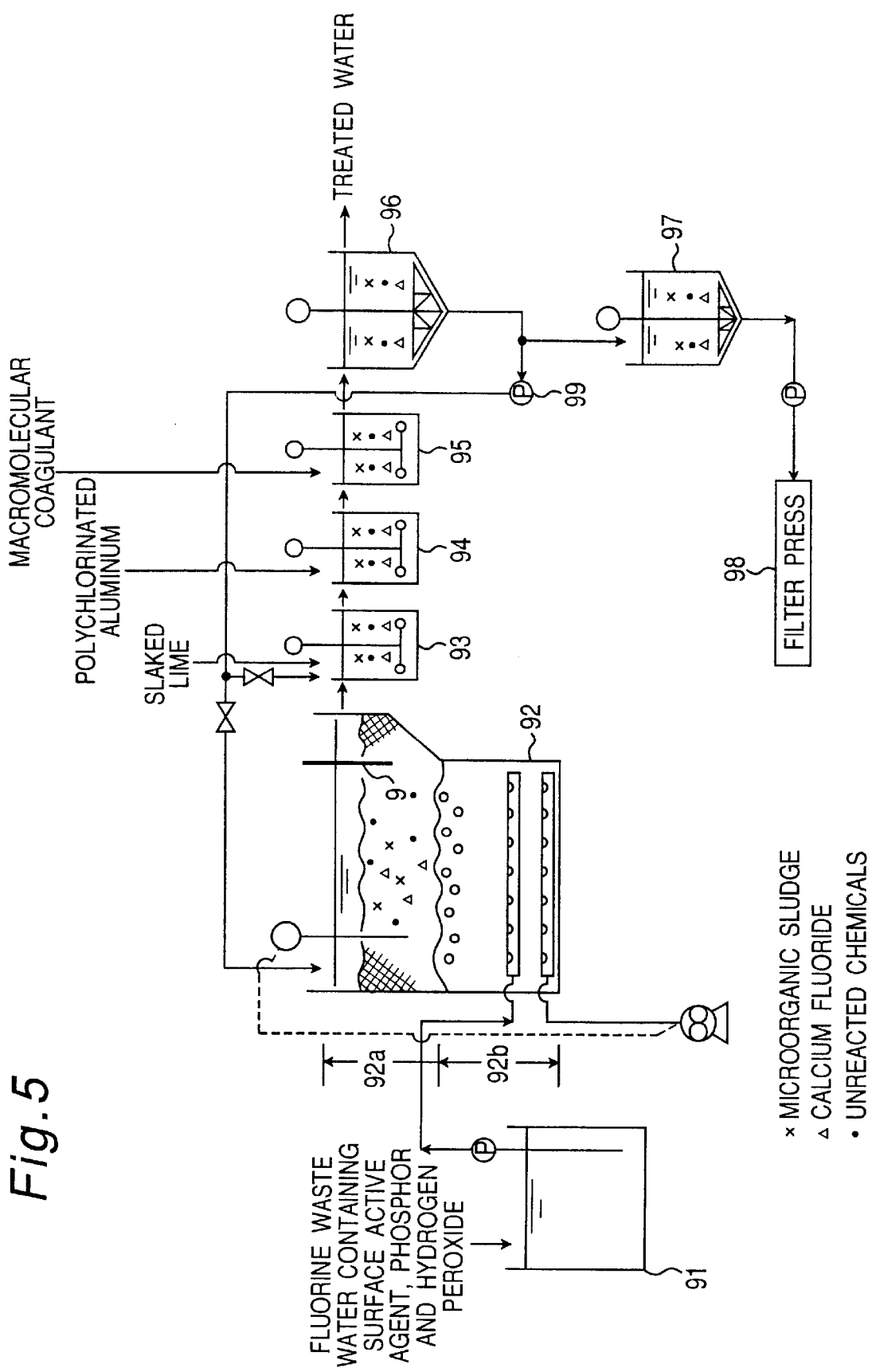
FIG. 5 is a view showing the construction of waste water treatment equipment different from FIG. 1, FIG. 3 and FIG. 4.

FIG. 5 is a schematic view of waste water treatment equipment of the present embodiment. A first water tank 91, a second water tank 92, a third water tank 93, a fourth water tank 94, a fifth water tank 95, a sixth water tank 96, a seventh water tank 97 and a filter press 98 have the same constructions and functions as those of the first water tank 41, the second water tank 42, the third water tank 43, the fourth water tank 44, the fifth water tank 45, the sixth water tank 46, the seventh water tank 47 and the filter press 48 of the first embodiment. Similar to the case of the first embodiment, sludge precipitated in the sixth water tank 96 is returned to an upper portion 92a of the second water tank 92 by a sedimentation tank sludge return pump 99.

In the present embodiment, the sludge precipitated in the sixth water tank 96 is returned not only to the upper portion 92a of the second water tank 92 but also to the third water tank 93. In this case, the sludge returned to the third water tank 93 includes the unreacted slaked lime, and therefore, the amount of slaked lime to be added to the third water tank 93 can be reduced. That is, according to the present embodiment, the reduction of the running cost of the slaked lime can be achieved by reducing the amount of slaked lime to be added.

Fifth Embodiment

Figure 6:
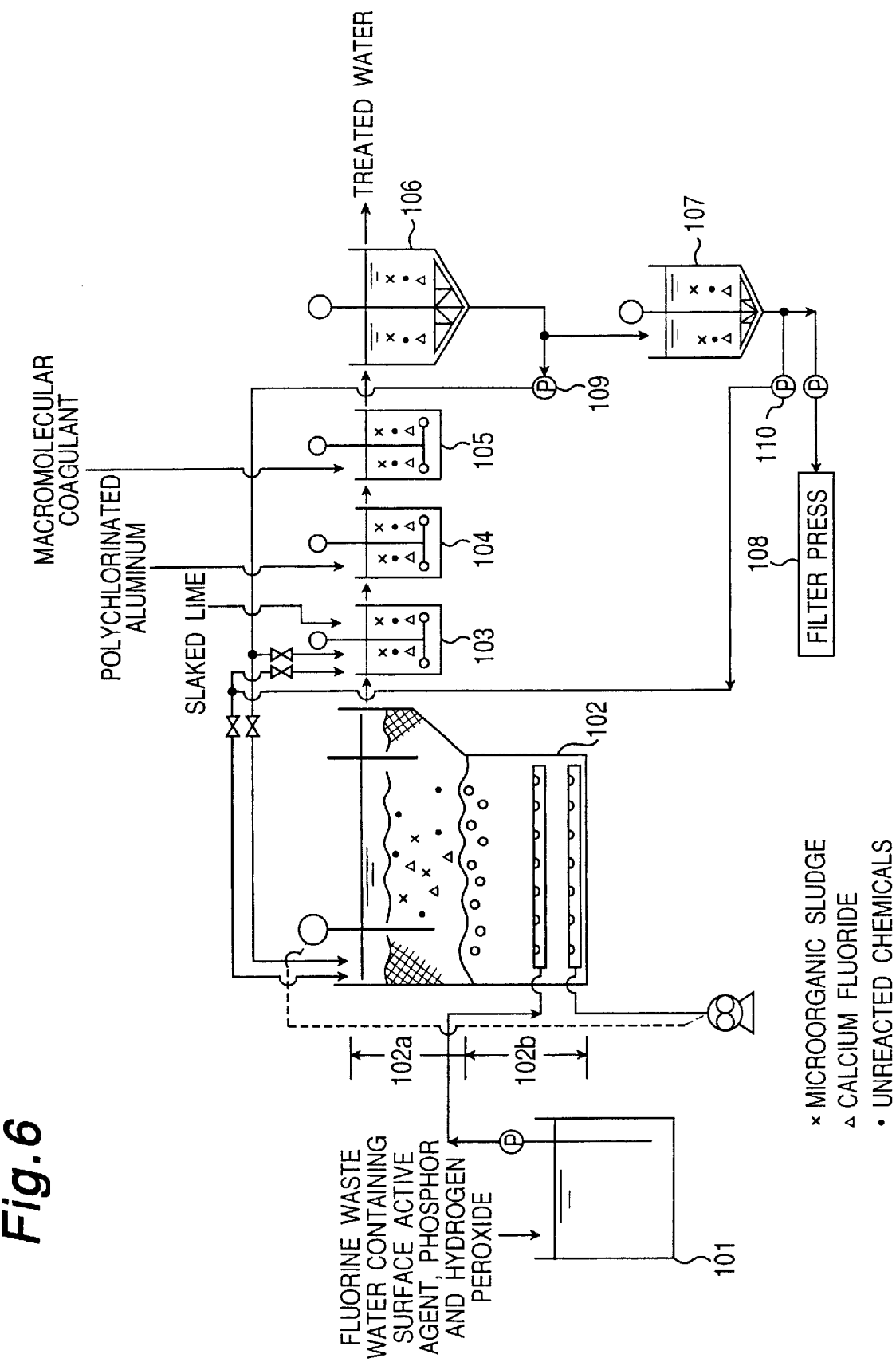
FIG. 6 is a view showing the construction of waste water treatment equipment different from FIG. 1 and FIG. 3 through FIG. 5.

FIG. 6 is a schematic view of waste water treatment equipment of the present embodiment. A first water tank 101, a second water tank 102, a third water tank 103, a fourth water tank 104, a fifth water tank 105, a sixth water tank 106, a seventh water tank 107 and a filter press 108 have the same constructions and functions as those of the first water tank 41, the second water tank 42, the third water tank 43, the fourth water tank 44, the fifth water tank 45, the sixth water tank 46, the seventh water tank 47 and the filter press 48 of the first embodiment. Similar to the case of the first embodiment, sludge precipitated in the sixth water tank 106 is returned to an upper portion 102a of the second water tank 102 by a sedimentation tank sludge return pump 109.

The present embodiment is constructed as follows.

(a) The sludge precipitated in the sixth water tank 106 is returned not only to the upper portion 102a of the second water tank 102 but also to the third water tank 103.

(b) Sludge condensed in the seventh water tank 107 is returned to the upper portion 102a of the second water tank 102 and the third water tank 103 by a condensation tank sludge return pump 110.

As described above, by sending the sludge precipitated in the sixth water tank 106 that serves as a sedimentation tank and the sludge condensed in the seventh water tank 107 that serves as a condensation tank back to the third water tank 103, a large amount of unreacted slaked lime is returned to the third water tank 103, so that the amount of slaked lime to be added to the third water tank 103 can be reduced further than in the fourth embodiment. That is, according to the present embodiment, the reduction of the running cost is achieved by the reduction in amount of slaked lime to be added as compared with the fourth embodiment.

Sixth Embodiment

Figure 7:
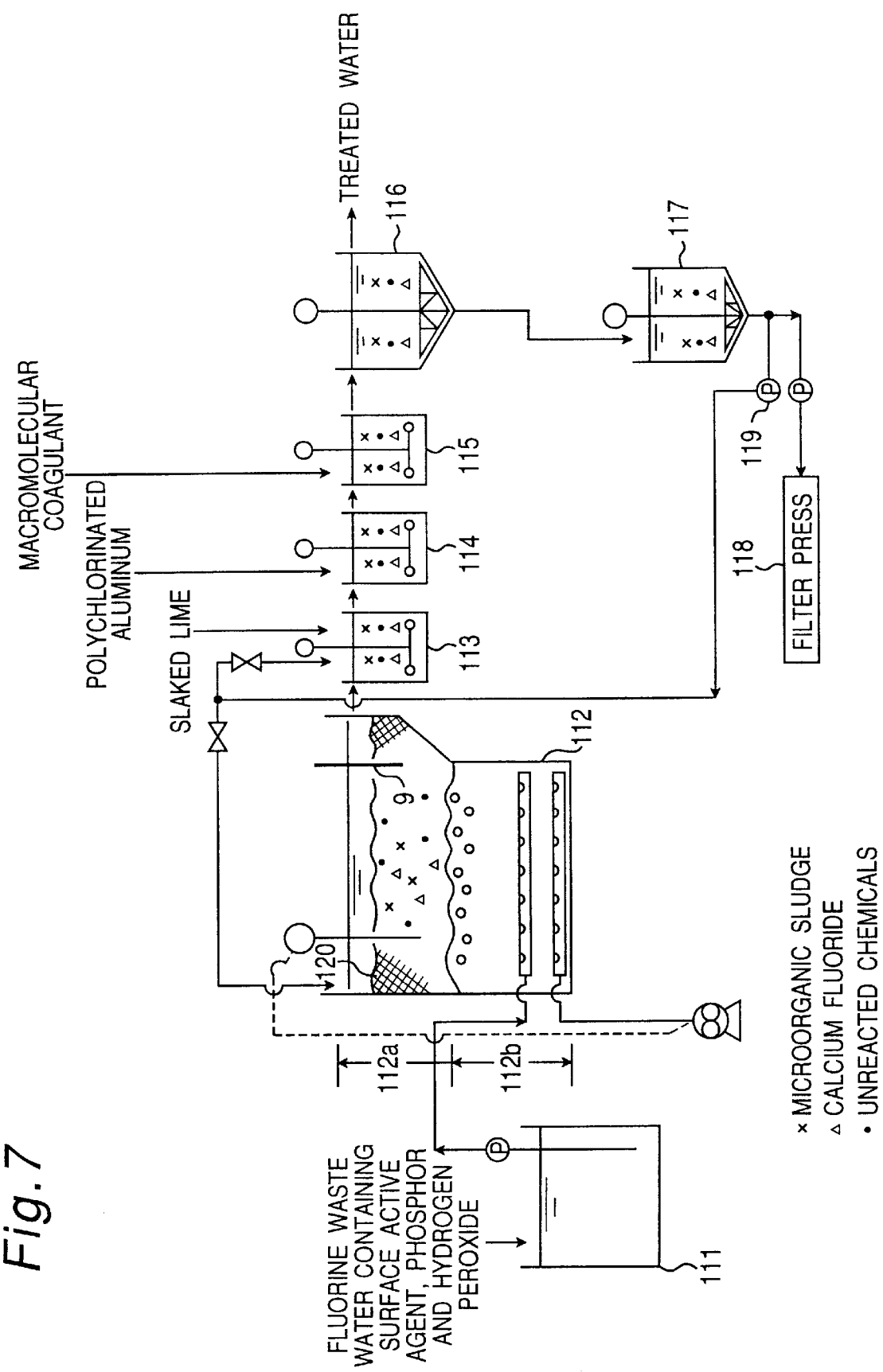
FIG. 7 is a view showing the construction of waste water treatment equipment different from FIG. 1 and FIG. 3 through FIG. 6.

FIG. 7 is a schematic view of waste water treatment equipment of the present embodiment. A first water tank 111, a second water tank 112, a third water tank 113, a fourth water tank 114, a fifth water tank 115, a sixth water tank 116, a seventh water tank 117 and a filter press 118 have the same constructions and functions as those of the first water tank 41, the second water tank 42, the third water tank 43, the fourth water tank 44, the fifth water tank 45, the sixth water tank 46, the seventh water tank 47 and the filter press 48 of the first embodiment. Similar to the case of the third embodiment, sludge precipitated in the sixth water tank 116 is not returned to an upper portion 112a of the second water tank 112. Then, by the condensation tank sludge return pump 119, sludge condensed in the seventh water tank 117 is returned to the upper portion 112a of the second water tank 112 to form an unreacted chemical sludge zone 120.

In the present embodiment, the sludge condensed in the seventh water tank 117 is returned not only to the upper portion 112a of the second water tank 112 but also to the third water tank 113. Thus, by sending the sludge including the anaerobic microorganisms condensed in the seventh water tank 117 that serves as a condensation tank back to the second water tank 112 and the third water tank 113, the high-concentration anaerobic microorganisms are circulated from the upper portion 112a of the second water tank 112 to the seventh water tank 117.

Therefore, according to the present embodiment, the hydrogen peroxide in the waste water can be securely treated by the reducibility owned by the high-concentration anaerobic microorganisms. Furthermore, the surface active agent having a relatively low biodegradability can be efficiently treated.

Seventh Embodiment

Figure 8:
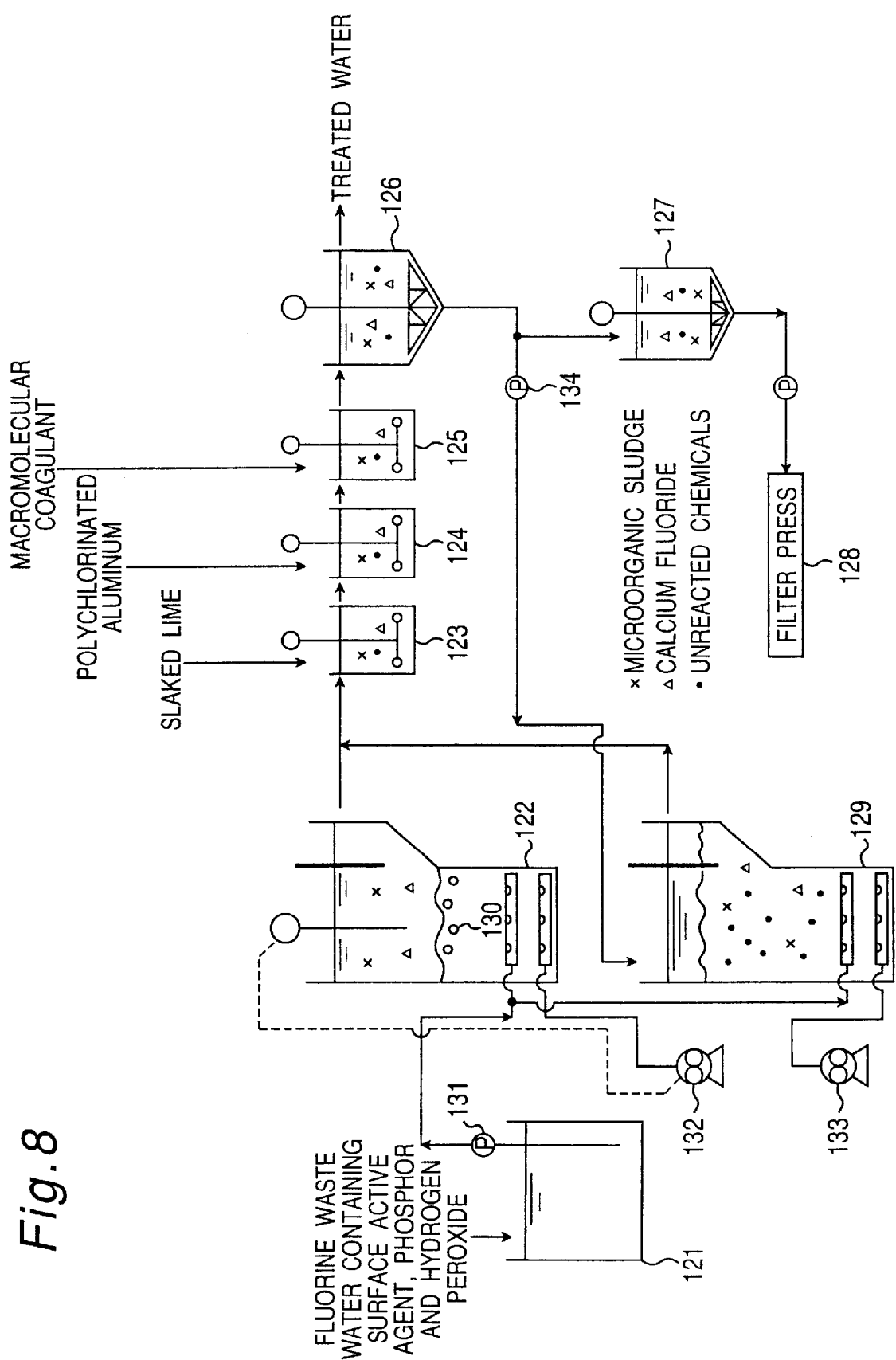
FIG. 8 is a view showing the construction of waste water treatment equipment different from FIG. 1 and FIG. 3 through FIG. 7.

FIG. 8 is a schematic view of waste water treatment equipment of the present embodiment. A first water tank 121, a third water tank 123, a fourth water tank 124, a fifth water tank 125, a sixth water tank 126, a seventh water tank 127 and a filter press 128 have the same constructions and functions as those of the first water tank 41, the third water tank 43, the fourth water tank 44, the fifth water tank 45, the sixth water tank 46, the seventh water tank 47 and the filter press 48 of the first embodiment.

The present embodiment is constructed as follows.

(a) A second water tank 122 has a structure similar to that of the second water tank 42 of the first embodiment, however, its capacity is one half that of the second water tank 42. This second water tank 122 contains a calcium carbonate mineral 130.

(b) An unreacted chemical reaction tank 129 that has a structure similar to that of the second water tank 42 of the first embodiment and a capacity being one half that of the second water tank 42 is provided. It is to be noted that the chemicals mentioned herein are the slaked lime and the coagulant (polychlorinated aluminum and macromolecular coagulant).

(c) The lower portions of both the second water tank 122 and the unreacted chemical reaction tank 129 are aerated by blowers 132 and 133.

(d) Waste water is introduced into both the second water tank 122 and the unreacted chemical reaction tank 129 by a first water tank pump 131.

(e) Sludge precipitated in the sixth water tank 126 is returned to the unreacted chemical reaction tank 129 by a sedimentation tank sludge return pump 134.

That is, according to the present embodiment, the waste water is treated by the unreacted slaked lime, the unreacted polychlorinated aluminum and the unreacted macromolecular coagulant in the return sludge from the sixth water tank 126 in the unreacted chemical reaction tank 129, allowing the chemicals to be recycled.

By treating the waste water in the second water tank 122 containing the calcium carbonate mineral having a specific gravity of 2.7 and in the unreacted chemical reaction tank 129 into which the return sludge having a specific gravity close to one is introduced, the total of the driving energy of the blowers 132 and 133 can be made approximately one half that of the case where the treatment is executed singly by the calcium carbonate mineral having the great specific gravity.

Eighth Embodiment

Figure 9:
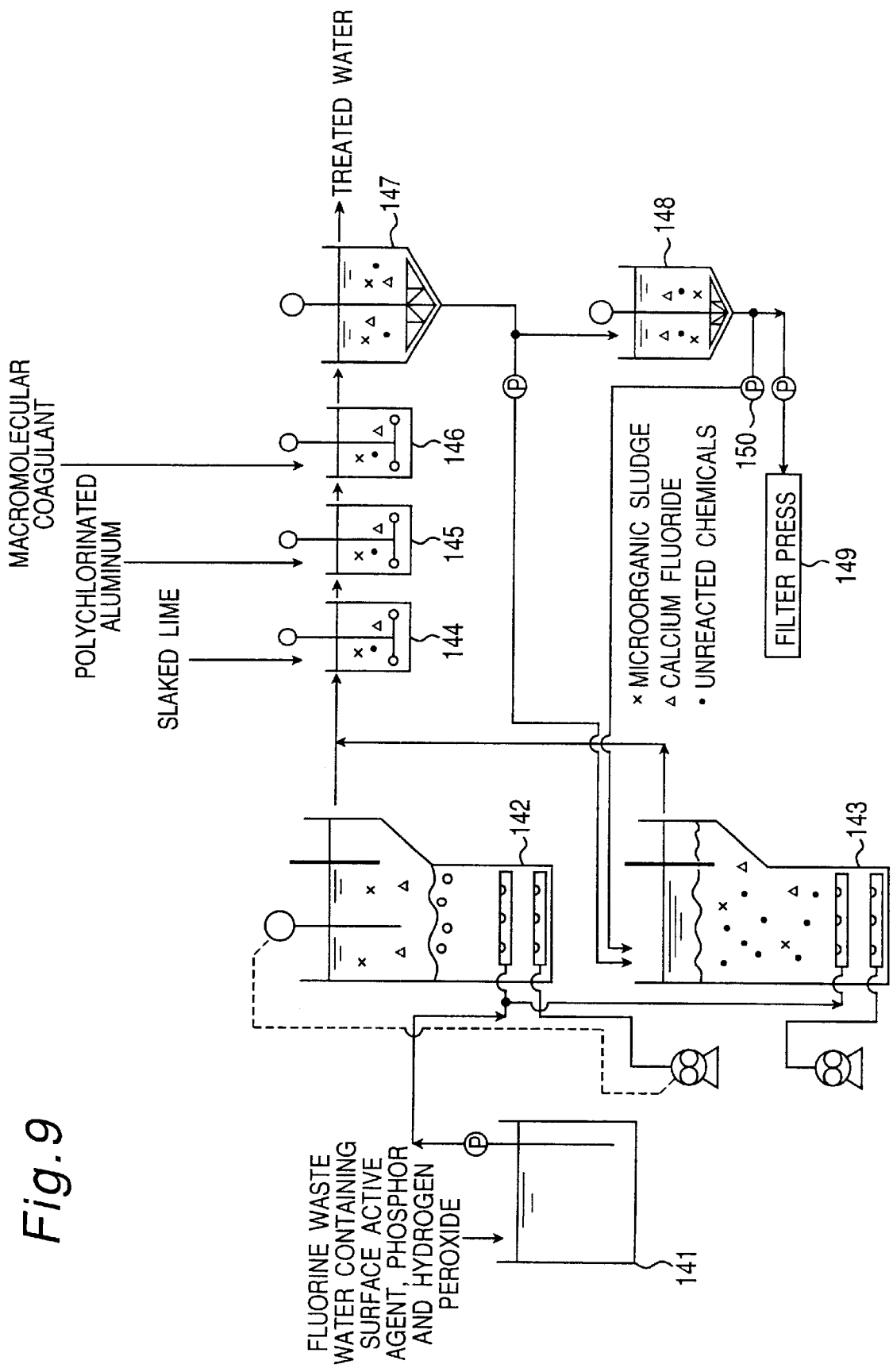
FIG. 9 is a view showing the construction of waste water treatment equipment different from FIG. 1 and FIG. 3 through FIG. 8.

FIG. 9 is a schematic view of waste water treatment equipment of the present embodiment. A first water tank 141, a second water tank 142, an unreacted chemical reaction tank 143, a third water tank 144, a fourth water tank 145, a fifth water tank 146, a sixth water tank 147, a seventh water tank 148 and a filter press 149 have the same constructions and functions as those of the first water tank 121, the second water tank 122, the unreacted chemical reaction tank 129, the third water tank 123, the fourth water tank 124, the fifth water tank 125, the sixth water tank 126, the seventh water tank 127 and the filter press 128 of the seventh embodiment. Furthermore, similar to the case of the seventh embodiment, the sludge precipitated in the sixth water tank 147 is returned to the unreacted chemical reaction tank 143.

In the present embodiment, sludge condensed in the seventh water tank 148 is returned to the unreacted chemical reaction tank 143 by a condensation tank sludge return pump 150. Therefore, in the unreacted chemical reaction tank 143, the fluorine and phosphor in the waste water are treated by a large amount of unreacted slaked lime, unreacted polychlorinated aluminum and unreacted macromolecular coagulant existing in the return sludge without using any new calcium carbonate mineral at all, and the hydrogen peroxide can be treated by the reducibility of the anaerobic microorganisms propagating particularly in the seventh water tank 148. Further, the surface active agent in the waste water can be treated by the microorganisms in the unreacted chemical reaction tank 143.

However, the present embodiment is inferior to the case of the second embodiment shown in FIG. 3 in terms of energy conservation, reduction in the amount of waste and the water quality of the treated water, since the waste water treatment system constructed of the second water tank 142 and the unreacted chemical reaction tank 143 is the parallel type and the return sludge is not utilized in the second water tank 142.

Ninth Embodiment

Figure 10:
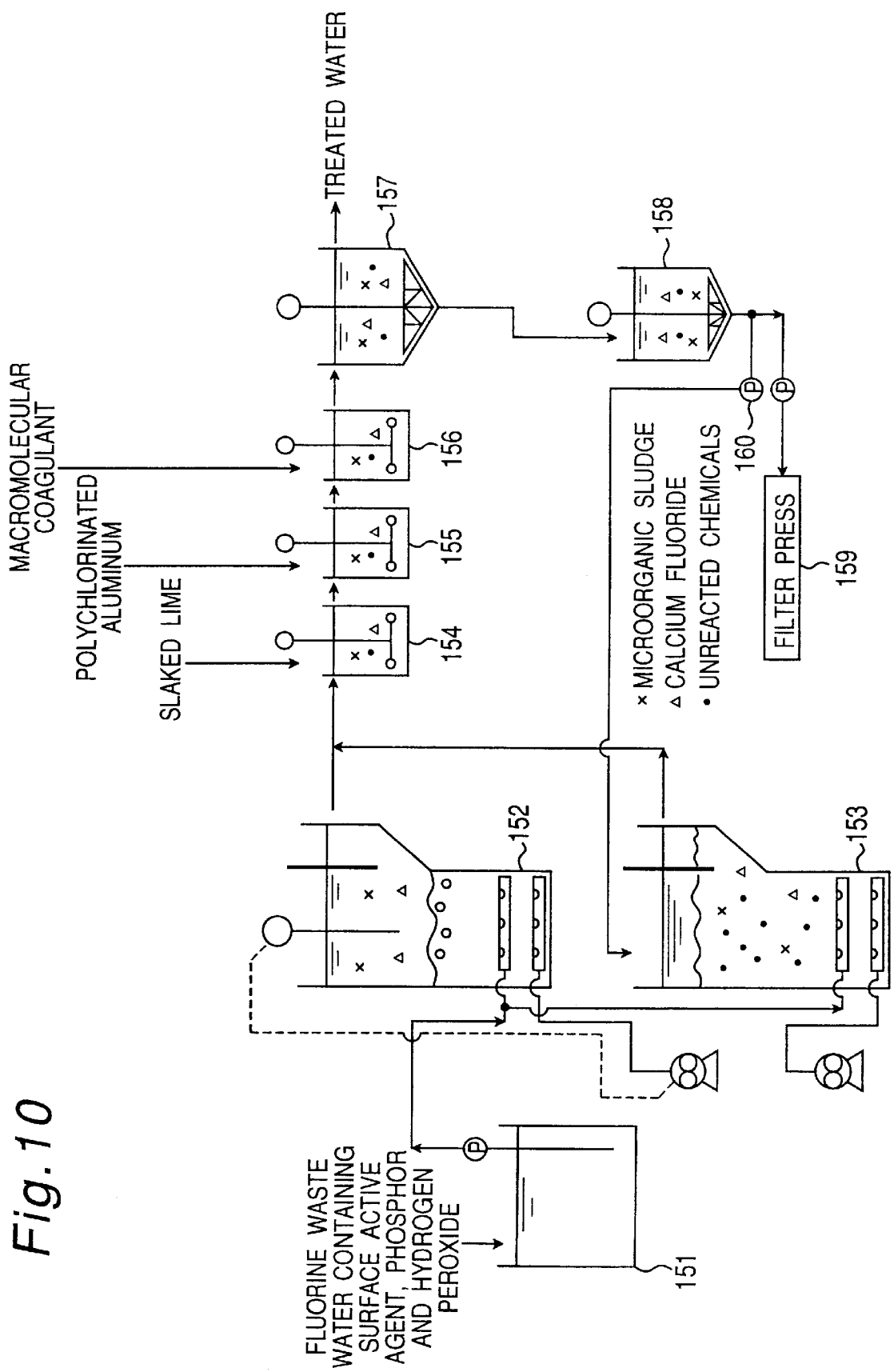
FIG. 10 is a view showing the construction of waste water treatment equipment different from FIG. 1 and FIG. 3 through FIG. 9.

FIG. 10 is a schematic view of waste water treatment equipment of the present embodiment. A first water tank 151, a second water tank 152, an unreacted chemical reaction tank 153, a third water tank 154, a fourth water tank 155, a fifth water tank 156, a sixth water tank 157, a seventh water tank 158 and a filter press 159 have the same constructions and functions as those of the first water tank 121, the second water tank 122, the unreacted chemical reaction tank 129, the third water tank 123, the fourth water tank 124, the fifth water tank 125, the sixth water tank 126, the seventh water tank 127 and the filter press 128 of the seventh embodiment.

It is to be noted that, in the present embodiment, differently from the case of the seventh embodiment, what is returned by a condensation tank sludge return pump 160 to the unreacted chemical reaction tank 153 is not sludge precipitated in the sixth water tank 157 but sludge condensed in the seventh water tank 158. Therefore, in the unreacted chemical reaction tank 153, the fluorine and phosphor in the waste water can be treated by the unreacted slaked lime, the unreacted polychlorinated aluminum and the unreacted macromolecular coagulant existing in the high-concentration return sludge without using any new calcium carbonate mineral at all. The hydrogen peroxide in the waste water can be treated more efficiently than in the cases of the seventh and eighth embodiments by the reducibility of the high-concentration anaerobic microorganisms propagating particularly in the seventh water tank 158. Furthermore, the surface active agent in the waste water can be treated by the high-concentration microorganisms in the unreacted chemical reaction tank 153.

However, the present embodiment is inferior to the third embodiment shown in FIG. 4 in terms of energy conservation, reduction in amount of waste and the water quality of the treated water, since the waste water treatment system constructed of the second water tank 152 and the unreacted chemical reaction tank 153 is the parallel type and the return sludge is not utilized in the second water tank 152.

Tenth Embodiment

Figure 11:
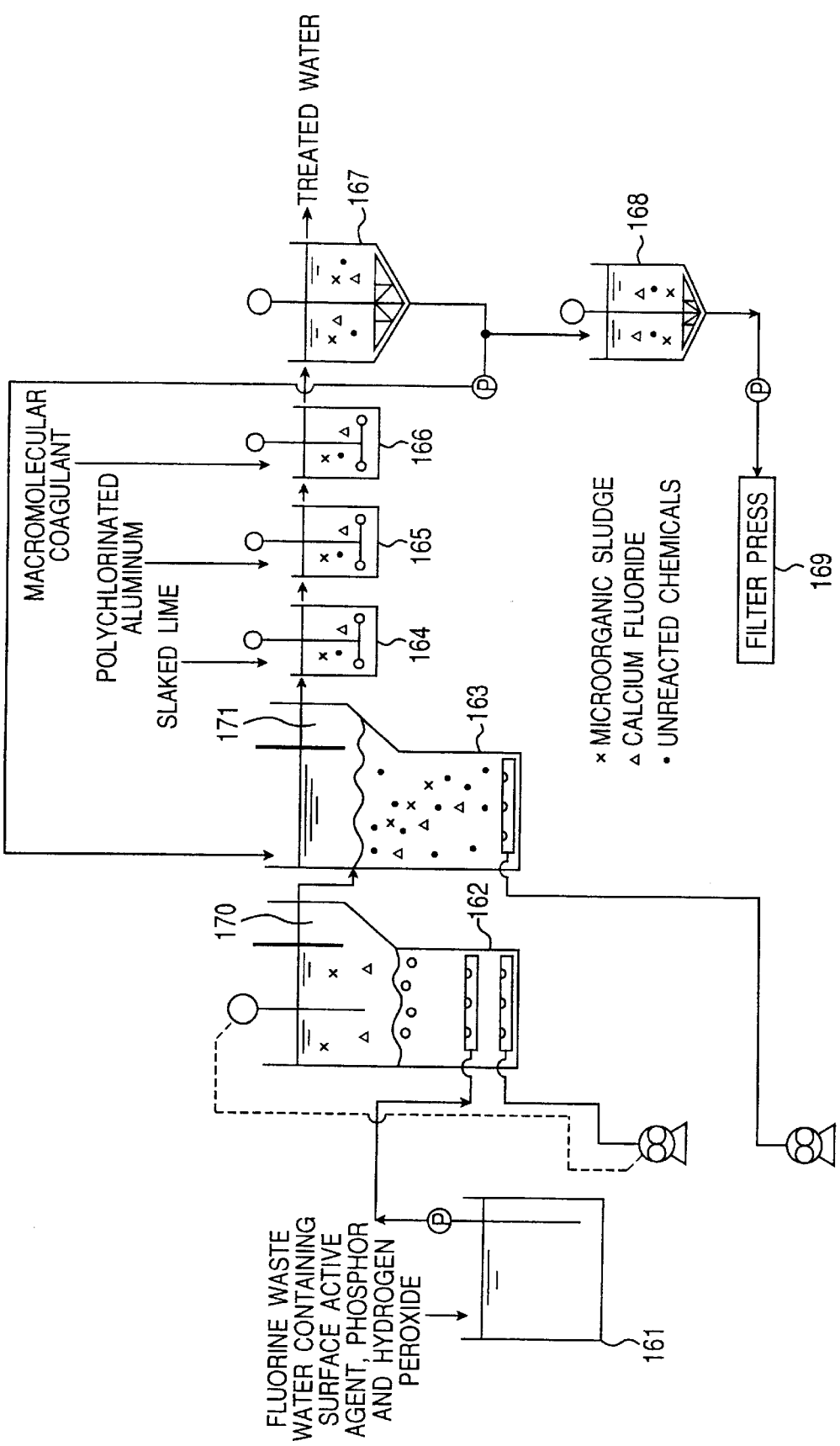
FIG. 11 is a view showing the construction of waste water treatment equipment different from FIG. 1 and FIG. 3 through FIG. 10.

FIG. 11 is a schematic view of waste water treatment equipment of the present embodiment. A first water tank 161, a second water tank 162, an unreacted chemical reaction tank 163, a third water tank 164, a fourth water tank 165, a fifth water tank 166, a sixth water tank 167, a seventh water tank 168 and a filter press 169 have the same constructions and functions as those of the first water tank 121, the second water tank 122, the unreacted chemical reaction tank 129, the third water tank 123, the fourth water tank 124, the fifth water tank 125, the sixth water tank 126, the seventh water tank 127 and the filter press 128 of the seventh embodiment. Further, sludge precipitated in the sixth water tank 167 is returned to the unreacted chemical reaction tank 163.

In the present embodiment, the second water tank 162 and the unreacted chemical reaction tank 163 are arranged in series with each other, where the waste water is introduced into only the second water tank 162 and the waste water obtained through the treatment is introduced into the unreacted chemical reaction tank 163. That is, in the present embodiment, the second water tank 162 is made to function as the lower portion 42b of the second water tank 42 of the first embodiment, while the unreacted chemical reaction tank 163 is made to function as the upper portion 42a of the second water tank 42 of the first embodiment.

Therefore, by treating the fluorine and phosphor in the waste water by the unreacted slaked lime, the unreacted polychlorinated aluminum and the unreacted macromolecular coagulant in the return sludge without using any new calcium carbonate mineral at all in the unreacted chemical reaction tank 163, the chemicals can be recycled. Furthermore, the hydrogen peroxide in the waste water can be treated by the anaerobic microorganisms in the unreacted chemical reaction tank 163. Furthermore, the surface active agent in the waste water can be treated by the microorganisms in the unreacted chemical reaction tank 163.

By treating the waste water in the second water tank 162 containing the calcium carbonate mineral having a specific gravity of 2.7 and in the unreacted chemical reaction tank 163 into which the return sludge having a specific gravity close to one is introduced, the total of the driving energy of the blowers can be approximately one half that of the case where the treatment is executed singly by the calcium carbonate mineral having the great specific gravity.

Furthermore, in the present embodiment, as described hereinabove, the second water tank 162 is made to function as the lower portion 42b of the second water tank 42 of the first embodiment, while the unreacted chemical reaction tank 163 is made to function as the upper portion 42a of the second water tank 42 of the first embodiment. Therefore, an effect approximately equivalent to that of the first embodiment can be expected. However, it is required to prepare two tanks of the second water tank 162 and the unreacted chemical reaction tank 163 and provide separation chambers 170 and 171 for the respective tanks, and therefore, the initial cost is higher than in the case of the first embodiment.

Eleventh Embodiment

Figure 12:
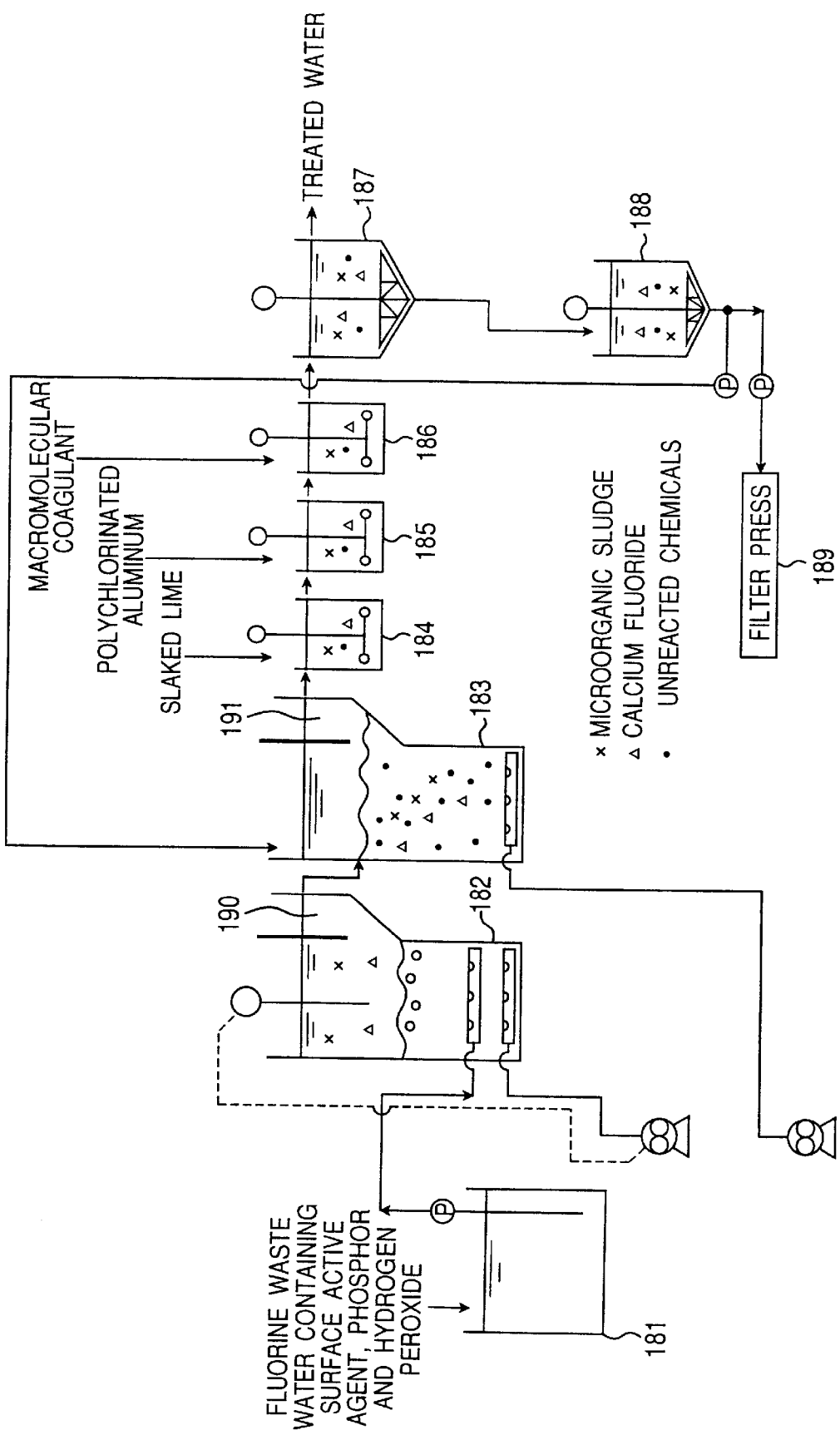
FIG. 12 is a view showing the construction of waste water treatment equipment different from FIG. 1 and FIG. 3 through FIG. 11.

FIG. 12 is a schematic view of waste water treatment equipment of the present embodiment. A first water tank 181, a second water tank 182, an unreacted chemical reaction tank 183, a third water tank 184, a fourth water tank 185, a fifth water tank 186, a sixth water tank 187, a seventh water tank 188 and a filter press 189 have the same constructions and functions as those of the first water tank 151, the second water tank 152, the unreacted chemical reaction tank 153, the third water tank 154, the fourth water tank 155, the fifth water tank 156, the sixth water tank 157, the seventh water tank 158 and the filter press 159 of the ninth embodiment. Further, sludge condensed in the seventh water tank 188 is returned to the unreacted chemical reaction tank 183.

In the present embodiment, the second water tank 182 and the unreacted chemical reaction tank 183 are arranged in series with each other, where the waste water is introduced into only the second water tank 182 and the waste water obtained after the treatment is introduced into the unreacted chemical reaction tank 183. That is, in the present embodiment, the second water tank 182 is made to function as a lower portion 82b of the second water tank 82 of the third embodiment, while the unreacted chemical reaction tank 183 is made to function as the upper portion 82a of the second water tank 82 of the third embodiment.

Therefore, by treating the fluorine and phosphor in the waste water by the unreacted slaked lime, the unreacted polychlorinated aluminum and the unreacted macromolecular coagulant in the return sludge without using any new calcium carbonate mineral at all in the unreacted chemical reaction tank 183, the chemicals can be recycled. The hydrogen peroxide in the waste water can be treated by the anaerobic microorganisms in the unreacted chemical reaction tank 183, and the efficiency of treatment is better than in the case of the tenth embodiment shown in FIG. 11. Furthermore, the surface active agent in the waste water can be treated by the high-concentration microorganisms in the unreacted chemical reaction tank 183.

In comparison with the third embodiment shown in FIG. 4, as described hereinabove, the second water tank 182 is made to function as the lower 82b of the second water tank 82 of the third embodiment, while the unreacted chemical reaction tank 183 is made to function as the upper portion 82a of the second water tank 82 of the third embodiment. Therefore, an effect approximately equivalent to that of the third embodiment can be expected. However, it is required to prepare two tanks of the second water tank 182 and the unreacted chemical reaction tank 183 and provide separation chambers 190 and 191 for the respective tanks, and therefore, the initial cost is higher than in the case of the third embodiment.

Twelfth Embodiment

Figure 13:
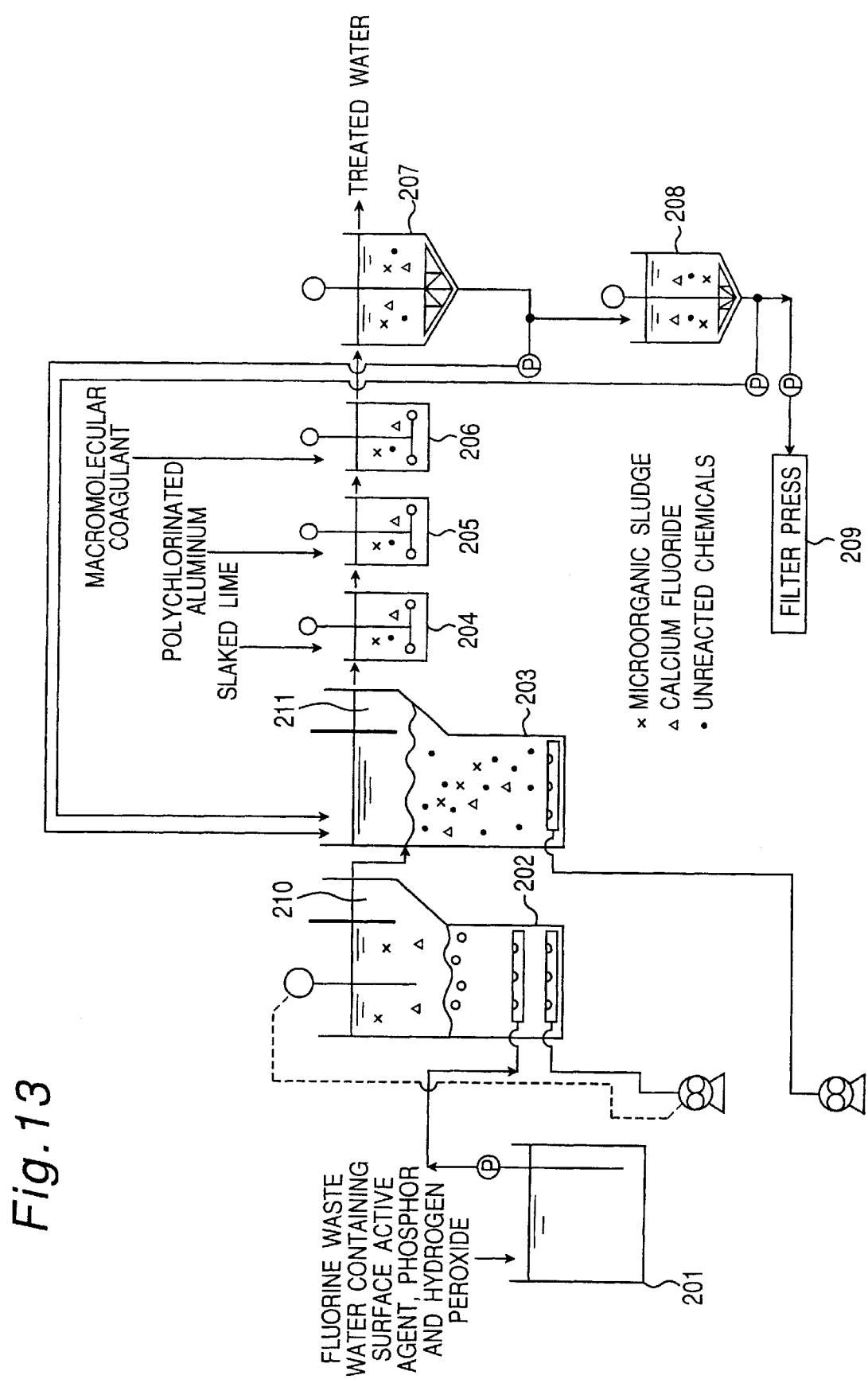
FIG. 13 is a view showing the construction of waste water treatment equipment different from FIG. 1 and FIG. 3 through FIG. 12.
Figure 14:
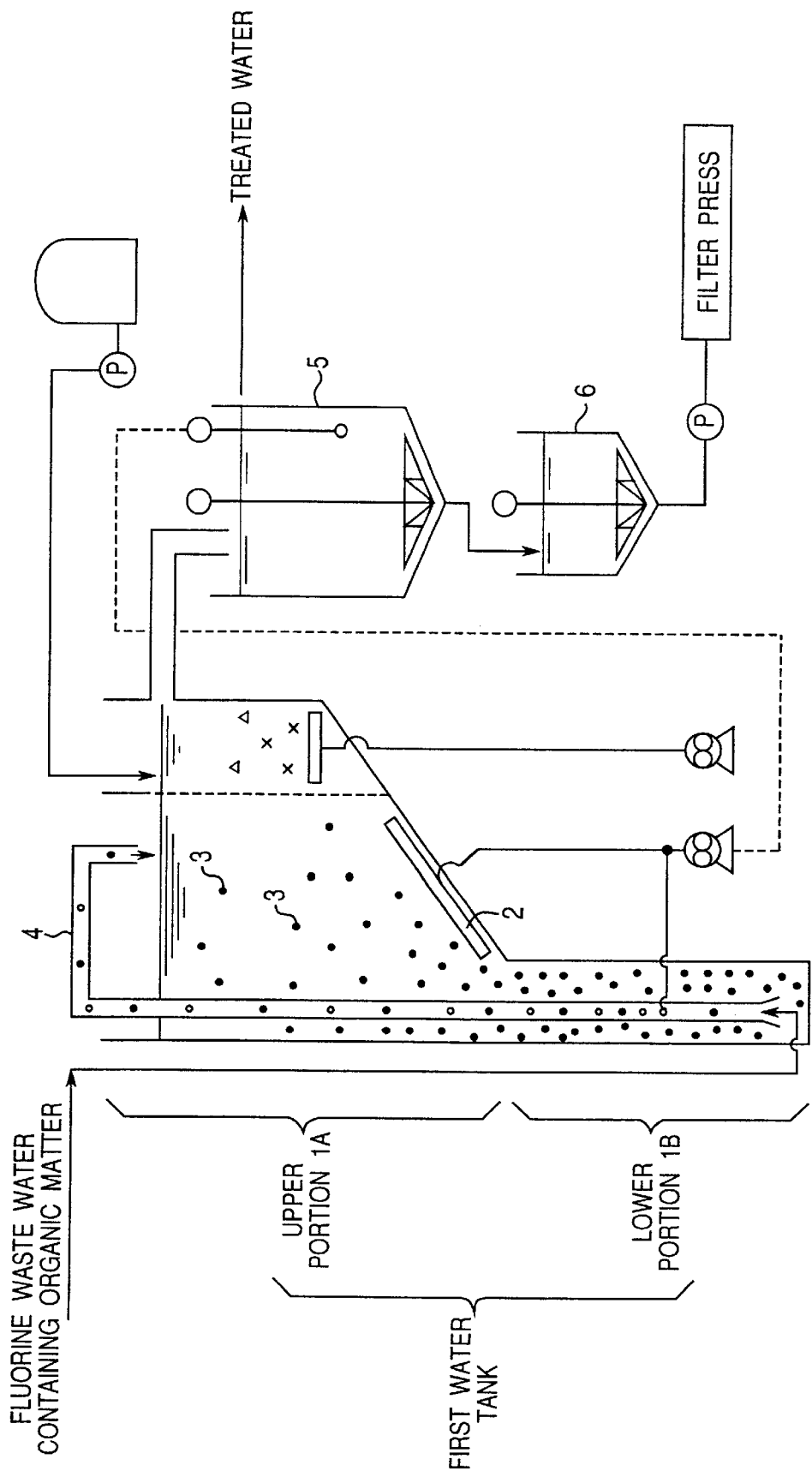
FIG. 14 is a view showing prior art waste water treatment equipment.
Figure 15:
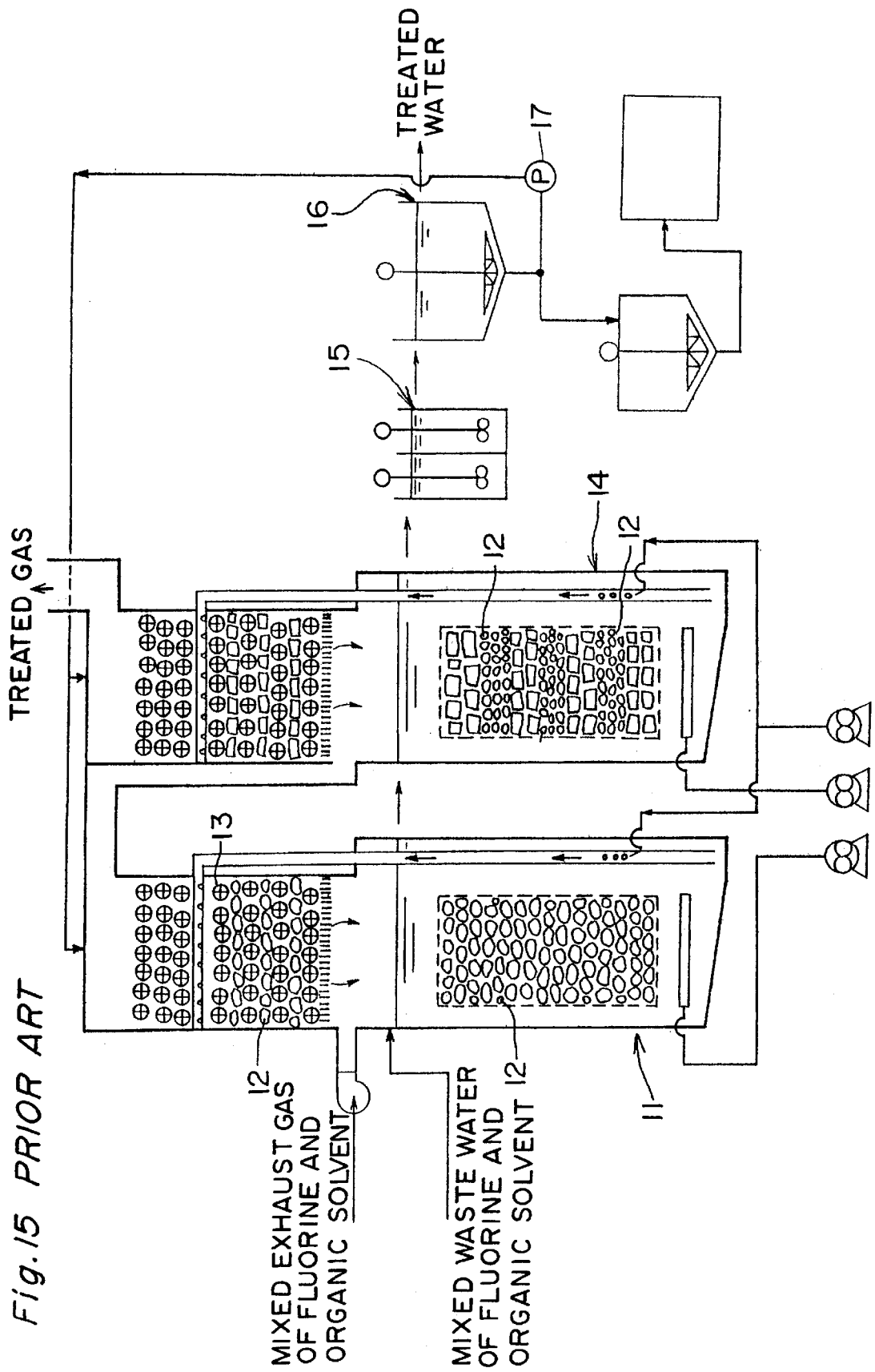
FIG. 15 is a view showing prior art waste water treatment equipment different from FIG. 14.

FIG. 13 is a schematic view of waste water treatment equipment of the present embodiment. A first water tank 201, a second water tank 202, an unreacted chemical reaction tank 203, a third water tank 204, a fourth water tank 205, a fifth water tank 206, a sixth water tank 207, a seventh water tank 208 and a filter press 209 have the same constructions and functions as those of the first water tank 161, the second water tank 162, the unreacted chemical reaction tank 163, the third water tank 164, the fourth water tank 165, the fifth water tank 166, the sixth water tank 167, the seventh water tank 168 and the filter press 169 of the tenth embodiment. Further, sludge precipitated in the sixth water tank 207 and sludge condensed in the seventh water tank 208 are returned to the unreacted chemical reaction tank 203.

In the present embodiment, the second water tank 202 and the unreacted chemical reaction tank 203 are arranged in series with each other, where the waste water is introduced into only the second water tank 202 and the waste water obtained after the treatment is introduced into the unreacted chemical reaction tank 203. The sludge condensed in the seventh water tank 208 is returned to the unreacted chemical reaction tank 203.

Therefore, the fluorine and phosphor in the waste water can be treated by the unreacted slaked lime, the unreacted polychlorinated aluminum and the unreacted macromolecular coagulant in the return sludge without using any new calcium carbonate mineral at all in the unreacted chemical reaction tank 203. The hydrogen peroxide in the waste water can be treated by the high-concentration anaerobic microorganisms in the unreacted chemical reaction tank 203. Furthermore, the surface active agent in the waste water can be treated by the high-concentration microorganisms in the unreacted chemical reaction tank 203.

In the present embodiment, the treatment of the objective substance to be treated in the waste water can be executed more surely by the highness of the microorganic concentration in the unreacted chemical reaction tank 203 than in the case of the tenth embodiment.

In comparison with the second embodiment shown in FIG. 3 as described hereinabove, the second water tank 202 is made to function as the lower portion 72b of the second water tank 72 of the second embodiment, while the unreacted chemical reaction tank 203 is made to function as the upper portion 72a of the second water tank 72 of the second embodiment. Therefore, an effect approximately equivalent to that of the second embodiment can be expected. However, it is required to prepare two tanks of the second water tank 202 and the unreacted chemical reaction tank 203 and provide separation chambers 210 and 211 for the respective tanks, and therefore, the initial cost is higher than in the case of the second embodiment.

First Experimental Example

As a concrete experimental example, a waste water treatment experimental example by means of the waste water treatment equipment of the first embodiment shown in FIG. 1 will be described next. In this experimental example, the capacity of the first water tank 41 was set to about 1 m$^3$, the capacity of the second water tank 42 was set to about 4 m$^3$, the capacity of each of the third water tank 43 through the fifth water tank 45 was set to about 0.5 m$^3$, the capacity of the sixth water tank 46 was set to about 3 m$^3$ and the capacity of the seventh water tank 47 was set to about 1 m$^3$.

The objective fluorine waste water containing surface active agent, phosphor and hydrogen peroxide to be treated has pH 2.3, a fluorine concentration of 163 ppm, a cationic surface active agent concentration of 0.10 ppm, an anionic surface active agent concentration of 0.12 ppm, a nonionic surface active agent concentration of 0.10 ppm, a phosphor concentration of 11.6 ppm and a hydrogen peroxide concentration of 86 ppm.

The fluorine waste water containing surface active agent, phosphor and hydrogen peroxide was treated by the waste water treatment equipment having the above construction, and then there were obtained the results of: pH 7.4 of the waste water after treatment, a fluorine concentration of 6 ppm, a cationic surface active agent concentration of 0.04 ppm, an anionic surface active agent concentration of 0.03 ppm, a nonionic surface active agent concentration of 0.04 ppm, a phosphor concentration of 0.3 ppm and a hydrogen peroxide concentration of 1 ppm.

Second Experimental Example

A waste water treatment experimental example by means of the waste water treatment equipment of the seventh embodiment shown in FIG. 8 will be described. In this experimental example, the capacity of the first water tank 121 was set to about 75 m$^3$, the capacity of the second water tank 122 was set to about 300 m$^3$, the capacity of the unreacted chemical reaction tank 129 was set to about 300 m$^3$, the capacity of the third water tank 123 was set to set to about 40 m$^3$, the capacity of the fourth water tank 124 about 40 m$^3$, the capacity of the fifth water tank 125 126 was set to about 230 m$^3$ and the capacity of the seventh water tank 127 was set to about 100 m$^3$.

The objective fluorine waste water containing, surface active agent, phosphor and hydrogen peroxide to be treated has pH 2.1, a fluorine concentration of 186 ppm, a cationic surface active agent concentration of 0.11 ppm, an anionic surface active agent concentration of 0.13 ppm, a nonionic surface active agent concentration of 0.11 ppm, a phosphor concentration of 12.3 ppm and a hydrogen peroxide concentration of 92 ppm.

The fluorine waste water containing surface active agent, phosphor and hydrogen peroxide was treated by the waste water treatment equipment having the above construction, and then there were obtained the results of: pH 7.6 of the waste water after treatment, a fluorine concentration of 6 ppm, a cationic surface active agent concentration of 0.03 ppm, an anionic surface active agent concentration of 0.03 ppm, a nonionic surface active agent concentration of 0.03 ppm, a phosphor concentration of 0.2 ppm and a hydrogen peroxide concentration of 1 ppm. The consumption of power of the blowers 132 and 133 could be reduced by about 50 percent as compared with the prior art waste water treatment method shown in FIG. 16. The calcium carbonate mineral that serves as the aforementioned chemical could also be reduced by about 50 percent, and the resulting waste generated from the waste water treatment equipment could be reduced totally by about 30 percent.

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A waste water treatment method for treating fluorine waste water containing organic matter, phosphor and hydrogen peroxide by means of a mixture of an inorganic sludge, an organic sludge, a biotic sludge and a calcium carbonate mineral.

2. A waste water treatment method as claimed in claim 1, wherein the inorganic sludge is sludge including unreacted slaked lime and unreacted polychlorinated aluminum, the organic sludge is sludge including an unreacted macromolecular coagulant, and the biotic sludge is sludge including microorganisms.

3. A waste water treatment method as claimed in claim 2, wherein the microorganisms are anaerobic microorganisms.

4. A waste water treatment method as claimed in claim 1, wherein the inorganic sludge, the organic sludge and the biotic sludge are return sludge from a sedimentation tank of waste water treatment equipment.

5. Waste water treatment equipment, comprising:

a first water tank into which fluorine waste water containing organic matter, phosphor and hydrogen peroxide is introduced;

a second water tank which has a stirring means and contains a calcium carbonate mineral and into which a return sludge is introduced;

a third water tank to which slaked lime is added;

a fourth water tank to which polychlorinated aluminum is added;

a fifth water tank to which a macromolecular coagulant is added;

a sixth water tank that functions as a sedimentation tank; and a seventh water tank that functions as a condensation tank.

6. Waste water treatment equipment as claimed in claim 5, comprising:

a sludge returning means for sending sludge precipitated in the sixth water tank back to an upper portion of the second water tank.

7. Waste water treatment equipment as claimed in claim 5, comprising:

a sludge returning means for sending sludge condensed in the seventh water tank back to an upper portion of the second water tank.

8. Waste water treatment equipment as claimed in claim 5, comprising:
a sludge returning means for sending sludge precipitated in the sixth water tank back to an upper portion of the second water tank and the third water tank.

9. Waste water treatment equipment as claimed in claim 5, comprising:
a sludge returning means for sending sludge condensed in the seventh water tank back to an upper portion of the second water tank and the third water tank.

10. Waste water treatment equipment as claimed in claim 5, wherein
the stirring means is a pneumatic stirring means for blowing out air.

11. Waste water treatment equipment as claimed in claim 5, wherein
the second water tank is constructed of:
an upper portion in which a mixed sludge zone comprised of an inorganic sludge, an organic sludge and a biotic sludge i s formed on the basis of the introduced return sludge; and
a lower portion in which the waste water from the first water tank is introduced and a calcium carbonate mineral zone is formed on the basis of the contained calcium carbonate mineral.

12. Waste water treatment equipment as claimed in claim 11, wherein
the stirring means has a control section for controlling an intensity of stirring on the basis of a control signal, and
a pH meter that measures pH is provided in the upper portion of the second water tank so as to send a control signal according to a measured value to the control section of the stirring means.

13. Waste water treatment equipment as claimed in claim 11, wherein
the biotic sludge constituting the mixed sludge zone in the upper portion of the second water tank includes both anaerobic microorganisms and aerobic microorganisms.

14. Waste water treatment equipment comprising:
a first water tank into which fluorine waste water containing organic matter, phosphor and hydrogen peroxide is introduced;
a second water tank which has a stirring means and contains a calcium carbonate mineral;
an unreacted chemical reaction tank which has a stirring means and in which a return sludge is introduced and reaction by means of unreacted chemicals in the return sludge is executed;
a third water tank to which slaked lime is added;
a fourth water tank to which polychlorinated aluminum is added;
a fifth water tank to which a macromolecular coagulant is added;
a sixth water tank that functions as a sedimentation tank; and
a seventh water tank that functions as a condensation tank.

15. Waste water treatment equipment as claimed in claim 14, comprising:
a sludge returning means for sending at least one of the sludge precipitated in the sixth water tank and the sludge condensed in the seventh water tank back to the unreacted chemical reaction tank.

16. Waste water treatment equipment as claimed in claim 14, wherein
the second water tank and the unreacted chemical reaction tank are connected in series with each other, and the waste water is treated by the unreacted chemical reaction tank subsequently to the second water tank.

17. Waste water treatment equipment as claimed in claim 16, comprising:
a sludge returning means for sending at least one of the sludge precipitated in the sixth water tank and the sludge condensed in the seventh water tank back to the unreacted chemical reaction tank.

18. Waste water treatment equipment as claimed in claim 14, wherein
the unreacted chemicals included in the return sludge are regenerated in the unreacted chemical reaction tank to treat the waste water.

19. Waste water treatment equipment as claimed in claim 18, wherein
the regeneration of the unreacted chemical is executed by mixing acid waste water with the return sludge and stirring the mixture.

20. Waste water treatment equipment as claimed in claim 19, wherein
the stirring means in the unreacted chemical reaction tank is a pneumatic stirring means for blowing out air.

* * * * *